(12) United States Patent
Baughman et al.

(10) Patent No.: US 7,938,996 B2
(45) Date of Patent: May 10, 2011

(54) POLYMER-FREE CARBON NANOTUBE ASSEMBLIES (FIBERS, ROPES, RIBBONS, FILMS)

(75) Inventors: Ray H. Baughman, Dallas, TX (US); Mikhail Kozlov, Dallas, TX (US); Von Howard Ebron, Dallas, TX (US); Ryan Capps, Dallas, TX (US); John P. Ferraris, Coppell, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 885 days.

(21) Appl. No.: 11/576,432

(22) PCT Filed: Sep. 30, 2005

(86) PCT No.: PCT/US2005/035220
§ 371 (c)(1),
(2), (4) Date: Mar. 30, 2007

(87) PCT Pub. No.: WO2006/137893
PCT Pub. Date: Dec. 28, 2006

(65) Prior Publication Data
US 2007/0243124 A1    Oct. 18, 2007

Related U.S. Application Data

(60) Provisional application No. 60/615,468, filed on Oct. 1, 2004.

(51) Int. Cl.
*D01F 9/12*    (2006.01)

(52) U.S. Cl. ..... 264/108; 264/105; 524/495; 423/447.1; 977/842; 23/314

(58) Field of Classification Search ............... 423/447.1; 23/314; 977/842; 524/495; 264/105, 108
See application file for complete search history.

(56) References Cited

U.S. PATENT DOCUMENTS
6,641,793 B2    11/2003    Haddon et al.

*Primary Examiner* — Stuart Hendrickson
(74) *Attorney, Agent, or Firm* — Ross Spencer Garsson; Matheson Keys Garsson & Kordzik

(57) ABSTRACT

Process, apparatus, compositions and application modes are provided that relate to nanofiber spinning without the use of superacids in the spinning solution. The methods employ either acids or bases for a flocculation solution. The advances disclosed therein enable the use of nanofibers, including carbon nanotubes, for a variety of applications including, but not limited to, electromechanical actuators, supercapacitors, electronic textiles, and in devices for electrical energy harvesting.

20 Claims, 12 Drawing Sheets

C

| Element | Weight% | SigmaW | Atomic% | SigmaA |
|---|---|---|---|---|
| C | 44.08 | 1.07 | 71.96 | 0.00 |
| O | 14.18 | 0.62 | 17.38 | 0.00 |
| S | 0.89 | 0.18 | 0.55 | 0.00 |
| Cl | 1.42 | 0.20 | 0.78 | 0.00 |
| Fe | 21.44 | 1.31 | 7.53 | 0.00 |
| Pt | 18.00 | 1.00 | 1.81 | 0.00 |

POLYMER-FREE CARBON NANOTUBE ASSEMBLIES (FIBERS, ROPES, RIBBONS, FILMS)

CROSS-REFERENCE TO RELATED APPLICATIONS

This Application for Patent claims priority to U.S. Provisional Patent Application Ser. No. 60/615,468, filed on Oct. 1, 2004.

The present invention was made with support from Defense Advanced Research Projects Agency Grant No. MDA 972-02-C-005, Texas Advanced Technology Program grant 009741-0130-2003, Robert A. Welch Foundation grant AT-0029, and the SPRING consortium in Texas.

FIELD OF THE INVENTION

The present invention relates generally to carbon nanotube structures, and more specifically to methods and apparatus for the processing of nanotube powders into polymer-free fibers, ribbons, ropes, films and other shaped articles having desirable electrical, mechanical, optical, and electrochemical properties.

BACKGROUND

Commercial synthesis methods produce nanofibers of either single-walled carbon nanotubes (SWNTs) or multi-walled carbon nanotubes (MWNTs) as a soot-like material. The strength and elastic modulus of individual carbon nanotubes in this soot are known to be exceptionally high, ~37 GPa and ~0.64 TPa, respectively, for SWNTs of about 1.4 nm diameter SWNTs [R. H. Baughman, A. A. Zakhidov, and W. A. de Heer, *Science* 297, 787-792 (2002)]. Relevant for applications needing light structural materials, the density-normalized modulus and strength of individual SWNTs are even more impressive, i.e., higher than steel wire by factors of ~19 and ~54, respectively. A critical problem hindering applications of these and other nanofibers is the need for methods for assembling these fibers having nanoscale dimensions into long fibers and fiber-derived shaped articles, of macroscale dimensions, that effectively utilize the properties of the nanofibers. Since such nanofibers can impart functionalities other than mechanical properties, methods are needed for enhancing the mechanical properties of filaments made of the nanofibers without compromising these other functionalities. Important examples of these other functionalities, together with the mechanical functionality that make the fibers multi-functional, are electrochromism, electrical and thermal conductivity, electromechanical actuation, and electrical energy storage.

A carbon single-wall (single-walled) nanotube (SWNT) consists of a single layer of graphite that has been wound up on itself into a seamless tube having a nanoscale diameter. A carbon multi-wall nanotube (MWNT), on the other hand, comprises two or more such cylindrical graphite layers that are coaxially nested one within the other in a manner analogous to Russian nesting dolls. Both single-wall and multi-wall nanotubes have been obtained using various synthetic routes that typically involve the use of metallic catalysts and very high processing temperatures. Typical synthesis routes are those employing a carbon arc, laser evaporation of carbon targets, and chemical vapor deposition (CVD).

SWNTs are produced by the carbon-arc discharge technique using a pure carbon cathode and a carbon anode containing a mixture of graphite powder and catalytic metal(s), like Fe, Ni, Co and Cu [D. S. Bethune et al. *Nature* 363, 605-7 (1993) and S. Iijima and T. Ichihashi, *Nature* 363, 603-5 (1993)]. C. Journal et al. [*Nature* 388, 756-758 (1997)] have described an improved carbon-arc method for the synthesis of SWNTs that uses Ni/Y (4.2/1 atom %) as the catalyst. Co-vaporization of carbon and the metal catalyst in the arc generator was shown to produce a web-like deposit of SWNTs that is intimately mixed with fullerene-containing soot.

Smalley and co-workers [A. Thess et al., *Science* 273, 483-487(1996)] developed a pulsed laser vaporization technique for the synthesis of SWNT bundles from carbon targets containing 1 to 2% (w/w) Ni/Co. The dual laser synthesis, purification and processing of carbon single-wall nanotubes has been described in the following references: J. Liu et al., *Science* 280, 1253 (1998); A. G. Rinzler et al., *Applied Physics A* 67, 29 (1998); A. G. Rinzler et al., *Science* 269, 1550 (1995); and H. Dai et al., *Nature* 384, 147 (1996).

A CVD method described by Cheng et al. [*Appl. Phys. Lett.* 72, 3282 (1998)] involves the pyrolysis of a mixture of benzene with 1 to 5% thiophene or methane, using ferrocene as a floating catalyst and 10% hydrogen in argon as the carrier gas. The nanotubes form in the reaction zone of a cylindrical furnace held at 1100-1200° C. Depending on the thiophene concentration, the carbon nanotubes form as either multi-wall nanotubes or bundles of single-wall nanotubes. Another useful method for growing carbon single-wall nanotubes uses methane as the precursor, ferric nitrate contained on an alumina catalyst bed, and a reaction temperature of 1000° C. [L. C. Qin et al, *Applied Physics Letters,* 72, 3437 (1998)].

Another CVD synthesis process was described by R. E. Smalley et al. in PCT Patent Application Publication Nos. WO 2000026138 and WO 2000017102, and by P. Nikolaev et al. in *Chem. Phys. Lett.* 313, 91-97 (1999). This process, known as the HiPco process, utilizes high pressure (typically 10-100 atm) carbon monoxide gas as the carbon source, and nanometer sized metal particles (formed in situ within the gas stream from metal carbonyl precursors) to catalyze the growth of single-wall carbon nanotubes. Suitable catalyst precursors are iron carbonyl ($Fe(CO)_5$) and mixtures of iron carbonyl and nickel carbonyl ($Ni(CO)_4$). The HiPco process produces a SWNT product that is essentially free of carbonaceous impurities, which are a major component of the laser-evaporation and carbon-arc products. Furthermore, the process enables control over the range of nanotube diameters produced, by controlling the nucleation and size of the metal cluster catalyst particles. In this way, it is possible to produce unusually small nanotube diameters (e.g., about 0.6 to 0.9 nm).

The nanotube-containing products of the laser-evaporation and carbon-arc processes invariably contain a variety of carbonaceous impurities, including various fullerenes and less-ordered forms of carbon soot. The carbonaceous impurity content in the raw products of the laser and carbon arc processes typically exceeds 50 weight %. Purification of these products generally relies on a selective dissolution of the catalyst metals and highly ordered carbon clusters (called fullerenes), followed by a selective oxidation of the less ordered carbonaceous impurities. A typical purification process is described by Liu et al. [*Science* 280, 1253 (1998)]. This method involves refluxing the crude product in 2.6 M nitric acid for 45 hours, suspending the nanotubes in pH 10 NaOH aqueous solution using a surfactant (e.g., TRITON X-100 from Aldrich, Milwaukee, Wis.), followed by filtration using a cross-flow filtration system While the effects of these purification processes on the nanotubes themselves are not completely understood, the carbon nanotubes are typically shortened by oxidation.

As discussed by B. I. Yakobson and R. E. Smalley [*American Scientist* 85, 325, (1997)], SWNT and MWNT materials are promising for a wide variety of potential applications because of the exceptional physical and chemical properties exhibited by the individual nanotubes or nanotube bundles. Some SWNT properties of particular relevance include metallic and semiconducting electrical conductivity (such conductivity being dependent upon the specific molecular structure), an extensional elastic modulus of 0.6 TPa or higher, tensile strengths of about 37 GPa and possibly higher, and surface areas that can exceed 300 m$^2$/g [R. H. Baughman, A. A. Zakhidov, and W. A. de Heer, *Science* 297, 787-792 (2002)].

The proposed applications of carbon nanotubes include mechanical applications, such as in high-strength composites, electrical applications, and multifunctional applications in which different physical properties of the carbon nanotubes are simultaneously utilized. Tennent et al. (U.S. Pat. No. 6,031,711) describe the application of sheets of carbon nanotubes as high performance supercapacitors. In this latter application, a voltage difference is applied to two high-surface-area carbon nanotube electrodes that are immersed in a solid or liquid electrolyte. Current flows, thereby injecting charge in the nanotubes, by creating an electrostatic double-layer near the nanotube surfaces.

The application of carbon nanotube sheets as electromechanical actuators has been recently described [R. H. Baughman et al., *Science* 284, 1340 (1999) and R. H. Baughman, C. Cui, J. Su, Z. Iqbal, and A. A. Zakhidov, U.S. Pat. No. 6,555, 945]. These actuators utilize dimensional changes that result from the double-layer electrochemical charge injection into high-surface-area carbon nanotube electrodes. If carbon nanotubes can be assembled into high modulus and high strength assemblies (such as filaments, ribbons, or sheets) that maintain their ability to electrochemically store charge, then superior actuator performance should be obtainable. The problem has been that no methods are presently available for the manufacture of nanotube articles that have these needed characteristics.

Those applications described above, as well as other promising applications, require assembling the individual nanotubes into macroscopic arrays that effectively use the attractive properties of the individual nanotubes. Failure to effectively achieve this has created an obstacle that has thus far hindered applications development. A primary problem is that MWNTs and SWNTs are insoluble in ordinary aqueous solvents and do not form melts even at very high temperatures.

Nanotube sheets (called "nanotube paper" or "bucky paper") comprising mostly nanotubes can be obtained by filtering a SWNT dispersion through a filter membrane, peeling the resulting sheet from the filter after washing and drying steps, and thermally annealing the sheet at high temperatures to remove impurities that convert to gases [A. G. Rinzler et al., *Appl. Phys. A* 67, 29 (1998) and Liu et al. in *Science* 280, 1253 (1998)]. This preparative method utilizes the fact that under certain conditions, and with the aid of surfactants and ultrasonic dispersion, bundles of SWNTs can be made to form a stable colloidal suspension in an aqueous medium. The obtained carbon nanotube sheets, which can range in conveniently obtainable thickness from 10-100 microns, possess mechanical strength derived from the micro-scale entanglement of the nanotube bundles. These nanotube sheets preserve the large accessible surface area of the nanotube bundles, but typically exhibit elastic modulus values (typically a few GPa) that are a very small fraction of the intrinsic elastic modulus of either the individual SWNTs or the SWNT bundles.

Glatkowski et al., in U.S. Pat. No. 6,265,466, teach a method for preparing an electromagnetic shielding composite having nanotubes, wherein the nanotubes are oriented when a shearing force is applied to the composite. The method includes a step of providing a polymer with an amount of nanotubes, and imparting a shearing force to the molten polymer containing carbon nanotubes to orient the nanotubes. Glatkowski et al. generically teach that the nanotube concentration can be as high as 15 wt %, but that it is preferable that the concentration is 0.1 to 1.5 wt %. These materials do not have properties that would render them useful in actual mechanical or electrochemical applications, since they are made with such a low loading of the carbon nanotubes.

Yashi et al. [Materials Research Society Symposium Proceedings, "Science and Technology of Fullerene Materials," 359, pg. 81-6, 1995] have attempted to overcome these problems by using a method for forming fiber of aligned carbon nanotubes by extruding a mixture of carbon nanotubes and polypropylene through a small die having a diameter of 2 mm that is maintained at about 200° C., so that the polypropylene is in molten state. As in the case with Glatkowski above, these materials do not have properties that would render them useful in actual mechanical or electrochemical applications, since they are made with such a low loading of the carbon nanotubes and the polypropylene remains in the final product. Use of high nanotube concentrations results in very high viscosities for the nanotube mixture with molten polymer, which essentially prohibits extrusion.

A. Lobovsky, J. Matrunich, R. H. Baughman, I. Palley, G. A. West, and I. Golecki have described (U.S. Pat. No. 6,764, 628) a melt spinning process that attempts to avoid the usual limitations caused by low concentrations of carbon nanotubes in melt spun fibers. This process involved melt compounding 30 weight percent of very large diameter multi-walled carbon nanotubes (150-200 nm in diameter and 50-100 microns in length) in a polypropylene matrix. This nanotube/polymer mixture was successfully spun as the sheath of a sheath/core polymer comprising polypropylene as the core. Despite the high viscosity of the nanotube/polymer mixture in the sheath and the brittleness of the solidified composition, the presence of the polymer core permitted this sheath-core spinning and the subsequent partial alignment of nanotubes in the sheath. Pyrolysis of the polypropylene left a nanotube fiber that is hollow (outer diameter=0.015 inches, inner diameter=0.0084 inches). To increase the strength of the hollow nanotube fiber, it was coated with carbon using a chemical vapor deposition (CVD) process. Even after this CVD coating process, however, the hollow nanotube fiber had low strength and low modulus and was quite brittle.

Although advances have been made in spinning polymer solutions in which carbon nanotubes are dispersed, the solution viscosity become too high for conventional solution spinning when the nanotube content rises above about 10%. Nevertheless, impressive mechanical properties have been obtained for solution spinning SWNTs in a polymer to provide a polymer nanotube composite, which in large part express the high mechanical properties of the polymer matrix for the nanotubes [T. V. Sreekumar, T. Liu, B. Min, G. Byung, H. Guo, S. Kumar, R. H. Hauge, R. E. Smalley, *Advanced Materials*, 16, 58-61 (2004) and S. Kumar, T. D. Dang, F. E. Arnold, A. R. Bhattacharyya, B. G. Min, X. Zhang, R. A. Vaia, C. Park, W. W. Adams, R. H. Hauge, R. E. Smalley, S. Ramesh, P. A. Willis, *Macromolecules* 35, 9039-9043, (2002)]. One problem with such approaches, however, is that the nanotubes are not present in sufficient quantities to effectively dominate such properties as mechanical modulus, mechanical strength, and thermal and electrical conductivity.

Methods are known for dry spinning multi-walled carbon nanotubes as yarns from MWNT forests [K. Jiang, Q. Li, S. Fan, *Nature* 419, 801 (2002)]. However, the fibers so obtained are so weak that they cannot be used for structural applications. In fact, such fibers are so weak that they cannot be processed into continuous lengths.

In another process [V. A. Davis et al, United States Patent Application Publication No. 2003170166 and L. M. Ericson et al., *Science* 305, 1447-1450, (2004)], single-walled carbon nanotubes were first dispersed in 100% sulfuric acid, or in another super acid, and then wet-spun into a coagulation bath comprising diethyl ether, water, or 5 wt % sulfuric acid. This method is referred as the super-acid coagulation spinning method (SACS), since the spinning solution used is a mixture of carbon nanotubes and a super acid. The resulting fibers have compromised properties, in part due to a partial degradation of the SWNTs and super acid intercalation, caused by prolonged contact with the super acid in the spinning solution. This creates a serious obstacle for practical applications. In order to partially reverse property degradation caused by prolonged exposure to super acid spinning solutions, and to thereby enhance electrical conductivity, it was necessary to anneal the as-spun fibers at high temperatures (typically 850° C. and higher), which would increase the cost of fiber production. Also, the use of 100% sulfuric acid or super acid in the spinning solution causes other problems that are not present for processes that do not use strongly acidic spinning solutions. These include the need to blanket the spinning solution with an inert atmosphere and the use of spinnerets, spinning solution containment means, and pumping means for applying pressure during spinning that are not corroded by the super acid in the spinning solution.

Polymer gel-based processes have been shown to enable the spinning of continuous fibers of SWNT/poly(vinyl alcohol) composites [B. Vigolo et al., *Science* 290, 1331 (2000); R. H. Baughman, *Science* 290, 1310 (2000); B. Vigolo et al., *Applied Physics Letters* 81, 1210-1212 (2002); A. Lobovsky, J. Matrunich, M. Kozlov, R. C. Morris, and R. H. Baughman, U.S. Pat. No. 6,682,677; and A. B. Dalton et al. *Nature* 423, 703 (2003)]. According to such processes, the carbon nanotubes are first dispersed in an aqueous or non-aqueous solvent with the aid of a surfactant. A jet of this nanotube dispersion is then injected into a viscous polymer solution that causes partial aggregation and alignment of the dispersed nanotube bundles to form a gel fiber, which is a dilute mixture of carbon nanotubes in an aqueous gel of the coagulation polymer. This gel fiber is weak; however, it has sufficient strength for slow manipulation leading to subsequent conversion of the gel fiber to a solid polymer fiber. In some processes, the wet gel fiber is washed in water or other liquid in order to remove some of the polymer binder, and the washed filament is subsequently withdrawn (drawn) from the wash bath and dried. During the draw-dry process, during which evaporation of the liquid occurs from the gel, capillary forces collapse the gel fiber into a solid fiber. This total process will henceforth be referred to as the polymer coagulation spinning (PCS) process.

In a typical PCS process, as described by Bernier and co-workers [Vigolo et al., *Science* 290, 1331 (2000)], the nanotubes are dispersed in water with the aid of sodium dodecyl sulfate (SDS) surfactant. The viscous carrier liquid is an aqueous solution of poly(vinyl alcohol) (PVA) in which the PVA serves to neutralize the effect of the SDS surfactant by directly replacing these molecules on the carbon nanotube surfaces during spinning. Bernier and co-workers describe preferred concentrations for the various ingredients, and viscosity ranges and flow velocities of the spinning solutions. Polarized light microscopy of the coagulated nanotube fibers confirms preferential alignment of the carbon nanotube along the fiber axis. Further evidence of carbon nanotube alignment is provided by the measured extensional elastic modulus, which is approximately 10-40 GPa for the final PCS fibers, as compared to typically 1 GPa for bucky paper.

Present problems with this process are that the nanotube fibers are inherently self-assembled in combination with PVA, and this PVA interferes with the electrical and thermal contacts between carbon nanotubes. Using existing technology, this polymer can only be completely removed from the gel fiber by thermal annealing that causes pyrolysis of the polymer. This removal of polymer by thermal pyrolysis degrades the mechanical properties of the nanotube fibers by decreasing strength and modulus and making them rather brittle.

Unfortunately, because of the presence of residual PVA, electrical and thermal conductivity of the fiber is smaller than that of nanofiber sheets. PVA, a typical insulating polymer, exhibits poor electrical and thermal conductivity as compared with carbon nanotubes. As a result, the conductivity of such composite fibers decreases with increasing PVA content; it also becomes substantially dependent on post-spinning washing, which does not remove all of the polymer. Other disadvantages of PVA-based fibers are poor thermal stability caused by decomposition of the polymer at 100-150° C., sensitivity to moisture, and reduced resistance to solvents. Also, the fibers made by the PCS process are not useful in applications as electrodes immersed in liquid electrolytes because of a surprising shape-memory effect. This shape-memory effect causes the PCS fibers to dramatically swell (by 100% or more) and lose most of their dry-state modulus and strength. Because of this structural instability of fibers made by the PCS process, they are unusable for critically important applications that use liquid electrolytes, such as in supercapacitors and in electromechanical actuators. In contrast, as-produced carbon nanotube sheets made from the same nanotubes can be used for both capacitor and actuator devices that use liquid electrolytes.

Thus, the prior art spinning processes are unsatisfactory for providing high loadings of underivatized polymer-free nanotubes in macroscopic nanotube fibers, which most desirably have continuous lengths. This absence of a suitable technology for spinning polymer-free nanotube fibers has been a barrier to application of carbon nanotubes and other nanotube fibers for such applications as mechanical elements, elements having high thermal conductivity, and as components in devices that provide electromechanical actuation, mechanical energy harvesting, mechanical dampening, thermal energy harvesting, and energy storage. Although the individual nanotube fibers have very attractive performance attributes, the prior art has not demonstrated processes whereby the properties of these individual nanotubes can be effectively used in macrofibers comprising the nanofibers. Additionally, no prior art technology has provided a method for spinning hollow carbon nanotube fibers, and such carbon nanotube fibers can be usefully employed for such applications as filtration, materials absorption, and materials transport. Methods that overcome the above-described deficiencies would be most desirable.

BRIEF DESCRIPTION OF THE INVENTION

Some embodiments of the present invention are directed to assemblies comprising nanofibers, wherein such assemblies can be in the form of fibers, ribbons, ropes, films, and other shaped articles, such articles typically having desirable electrical, mechanical, optical, and/or electrochemical properties. In some or other embodiments, the present invention is directed to methods/processes of making such assemblies, and to apparatus for implementing such methods and processes. In still other embodiments, the present invention is directed to articles and/or applications comprising and/or using such assemblies of nanofibers.

There is considerable flexibility in the type of nanofibers used in embodiments of the present invention, and in the form that the assembly takes. Carbon nanotubes and nanoscrolls are exemplary nanofibers, but other types and combinations of nanofibers can be utilized instead of, or in addition to, carbon-based nanofibers. Likewise, fibers are an exemplary form of assembly, but assemblies of the present invention are not limited to such fibers. Judicious selection in the type and/or combination of nanofibers permits the assemblies described herein to be fabricated with the wide range of properties outlined above.

In some embodiments, the present invention is directed to methods for making such assemblies, the methods generally comprising the steps of (a) dispersing nanofibers in a dispersion liquid that has a proton-donating ability below that of 100% sulfuric acid to form a dispersion of nanofibers, wherein said dispersion does not include intentionally added polymer; (b) providing a flocculation liquid, the liquid having a pH selected from the group consisting of acidic pH and basic pH, wherein the acidic pH is less than 3 and the basic pH is greater than 11; (c) injecting the dispersion of nanofibers into the flocculation liquid such that flocculation occurs to yield a primary nanofiber assembly; and (d) (optionally) substantially removing the flocculation liquid from the primary nanofiber assembly to yield a secondary nanofiber assembly that is substantially free of a liquid, wherein said secondary nanofiber assembly has a form selected from the group consisting of a fiber, a rope, a sheet, a ribbon, a film, and combinations thereof. For the purposes of this invention, aqueous and alcohol-based solutions are considered to possess proton-donating ability.

In some embodiments, the nanofibers have a number-average diameter that is typically less than 1000 nm, more typically less than 100 nm, even more typically less than 10 nm, and most typically less than approximately 2 nm. By number-average diameter we mean the average outer diameter of a nanofiber weighted according to the frequency of occurrence of this diameter. In some embodiments, a majority weight fraction of the nanofibers have a maximum length-to-thickness ratio, in their thinnest lateral direction, of at least approximately 1000. In some embodiments, said nanofibers comprise material selected from the group consisting of imogolite and similar aluminosilicate nanofibers; allophane nanofibers; SiC nanofibers; boron nitride nanofibers; carbon nanofibers; $MgB_2$ nanofibers; carbon doped $MgB_2$ nanofibers; Bi nanofibers, nanofibers of binary group III-V elements; Si nanofibers; ZnO nanofibers; silica nanofibers; $In_2O_3$ nanofibers; $V_2O_5$ nanofibers; nanofibers of GaN, CdS, CdSe, ZnS and other (II-VI) materials; nanofibers of transition metal dichalcogenides that can be described as $MX_2$, wherein M=Mo, W, Nb, Ta, Ti, Zr, Hf; Re and wherein X=S, Se; selenium nanofibers; nanofibers that are compounds of Mo, S, and I; derivatized nanofibers of any of the aforementioned types; and combinations thereof. In some embodiments, said nanofiber comprises single walled nanotubes, double walled nanotubes, other types of multiwalled nanotubes other than double walled nanotubes, scrolled nanotubes, coiled nanofibers, functionalized nanofibers, crimped nanofibers, and combinations thereof. In some such embodiments, said nanotubes and other nanofibers comprise predominantly carbon by weight. In some such embodiments, the nanofiber comprises predominantly, by weight, material selected from the group consisting of single walled carbon nanotubes, types of multiwalled nanotubes other than double walled nanotubes, and combinations thereof. In some such embodiments, at least some of the carbon nanotubes are functionalized carbon nanotubes.

In some embodiments, the dispersion liquid comprises water as its majority component by weight. In some embodiments, the step of dispersing involves using a dispersal aid that functions as a surfactant. In some such embodiments, the dispersal aid is selected from the group consisting of sodium dodecylsulfate, lithium dodecylsulfate, octylphenol ethoxylate, sodium dodecylbenzenesulfonate, sodium dodecylsulfonate, sodium n-lauroylsarcosinate, a sodium alkyl allyl sulfosuccinate, the sodium salt of poly(styrene sulfonate), charged colloidal particles, and combinations thereof. In some embodiments, the step of dispersing involves ultrasonic assistance. In some embodiments, there is an additional step of removing undesired particle components from the dispersion via a process selected from the group consisting of centrifugation, filtration, and combinations thereof. In some of the above-described embodiments, the pH of the dispersion liquid is typically between 3 and 11, and more typically between 6 and 8.

In some embodiments, the step of removing the flocculation liquid involves a technique such as, but not limited to, filtration, evaporation, washing, and combinations thereof. In some embodiments, this step of removing the flocculation liquid can be viewed as removing liquid from the primary nanofiber assembly to produce the secondary nanofiber assembly. In some embodiments, the processes of causing substantial displacement of the flocculation liquid is done with a secondary liquid followed by the substantial removal of said secondary liquid to provide a secondary nanofiber assembly that is substantially free of a liquid. In some embodiments, the secondary liquid has a pH between 3 and 11. In some embodiments, the secondary liquid is more volatile at the temperature used for substantial removal of said secondary liquid than is the flocculation liquid. In some embodiments, the secondary liquid comprises an alcohol. In some embodiments, removal of the flocculation and/or secondary liquid is conducted by exposing the primary nanofiber assembly to an environmental temperature between 100° C. and 1200° C., wherein the primary nanofiber assembly initially comprises a liquid selected from the group consisting of the flocculation liquid, a liquid that displaces this flocculation liquid, and combinations thereof. In some such embodiments, the environmental temperature is between 100° C. and 500° C.

In some embodiments, conversion of the primary nanofiber structure to the secondary nanofiber structure involves a heating means, wherein this heating means is provided by a technique such as, but not limited to, resistive heating of the nanofibers by conducting current along the nanofiber assembly; absorption by the primary nanofiber assembly of radiation selected from the group consisting of visible, ultraviolet, infrared, radio frequency, and microwave frequency radiation; and combinations thereof.

In some embodiments, removing liquid from the primary nanofiber assembly to produce the secondary nanofiber assembly is conducted by exposing the primary nanofiber assembly to an environmental temperature between room temperature and 100° C., wherein the primary nanofiber assembly initially comprises a liquid selected from the group consisting of the flocculation liquid, a liquid that displaces this flocculation liquid, and combinations thereof. In some such embodiments, said exposure is carried out in an environment selected from the group consisting of an inert gas atmosphere, a vacuum, and combinations thereof.

In some embodiments, the flocculation agent comprises an acid selected from the group consisting of HCl, HBr, HI, $HClO_4$, $HBF_4$, $H_2SO_4$, $HNO_3$, $H_3PO_4$, oxalic acid, formic acid, acetic acid, benzoic acid, and combinations thereof. In some embodiments, the flocculating agent is a base selected from the group consisting of NaOH, KOH, LiOH, $NH_4OH$, and combinations thereof. In some embodiments, any of the nanofiber dispersion, the flocculation solution, any liquid that displaces the flocculation solution in the primary nanofiber assembly, contains colloidal particles in addition to the nanofibers present in the nanofiber dispersion, and wherein these colloidal particles are at least partially acquired and retained in the secondary nanofiber assembly. In some such embodiments, at least a fraction of these colloidal particles are those that provide useful catalytic activity. In some such embodiments, said useful catalytic activity is useful for providing catalytic activity for a fuel cell electrode.

In some embodiments, the flocculation liquid comprises a viscosity that is less than that for the dispersion of nanofibers, when both viscosities are measured under the same conditions of temperature and pressure. In some embodiments, the flocculation liquid comprises a viscosity that is less than that for the dispersion of nanofibers when measured at temperature and pressure conditions used for flocculation of the dispersion of nanofibers by contact between the dispersion of nanotubes and the flocculation liquid. In some embodiments, any liquid component in the flocculation liquid comprises a viscosity that is less than the viscosity of the dispersion of nanotubes when both viscosities are measured under the same conditions of temperature and pressure. In some embodiments, any liquid component in the flocculation liquid comprises a viscosity that is less than that of the dispersion of nanotubes when both viscosities are measured at temperature and pressure conditions used for flocculation of the dispersion of nanofibers by contact between the dispersion of nanotubes and the flocculation liquid. In some embodiments, the flocculation liquid comprises aqueous hydrochloric acid.

In some embodiments, the fiber, rope, ribbon, or film (secondary nanofiber assembly) comprises at least 90% by weight nanofibers and associated impurities introduced during nanofiber synthesis. In some or other embodiments, the fiber, rope, ribbon, or film comprises at least 90% by weight carbon nanotubes and associated impurities introduced during nanotube synthesis.

In some embodiments, the primary nanofiber assembly comprises a gel. In some embodiments, there is an infiltration of said primary nanofiber assembly with a polymer to form an infiltrated polymer prior to producing a secondary nanofiber assembly that is substantially free of a liquid.

In some embodiments, no polymer is added to the nanofibers of nanofiber assemblies during processing. In some embodiments, the secondary nanofiber assembly contains less than 2% by weight polymer. In some such embodiments, a majority fraction of the polymer in the fiber is extracted via a technique selected from the group consisting of a liquid means, pyrolysis, and combinations thereof.

In some embodiments, wherein said secondary nanofiber assembly is a fiber, and wherein this fiber is mechanically drawn to at least 50% of the breaking strain, so as to thereby increase the orientation of nanofibers in the fiber. In some such embodiments, said fiber comprises predominantly, by weight, carbon nanotubes and impurities introduced during carbon nanotube synthesis.

In some embodiments, the step of substantially removing the flocculation liquid is conducted while the primary nanofiber assembly is under mechanical tension, the tension having a maximum value during the liquid removal process that is at least 10% of the initial breaking stress of the primary nanofiber assembly.

In some embodiments, the secondary fiber is thermally annealed at a temperature of less than 3000° C. In some such embodiments, said secondary fiber is comprised of carbon nanotubes, and wherein said thermal annealing involves a maximum temperature of less than 1500° C. In some such embodiments, said annealing is in a reactive atmosphere and wherein reaction induced by this atmosphere results in a treatment of the secondary fiber, the treatment selected from the group consisting of coating, infiltrating, and combinations thereof. In some such said annealing is carried out in an environment selected from the group consisting of a vacuum, a substantially inert atmosphere, and combinations thereof. In some such embodiments, the process of thermally annealing both the as-formed and water washed fiber results in an increased electrochemical capacitance for the fiber, and wherein the fiber comprises carbon nanotubes.

In some embodiments, lateral pressure is applied to the primary nanofiber assembly during removal of either the flocculation liquid or a liquid that displaces the flocculation liquid. In some such embodiments, said lateral pressure is done by passing primary nanofiber assembly between cylinders that rotate in opposite directions, and wherein the separation of these rollers is substantially less than the initial thickness of the primary nanofiber assembly. In some such embodiments, said primary nanofiber assembly comprises a gel that has a shape selected from the group consisting of a fiber, a ribbon, and combinations thereof. Typically said gel does not include any organic polymer that is not present as an impurity in the as-synthesized nanofibers. In some such embodiments, said primary nanofiber assembly comprises carbon nanotubes.

A variety of additives can be added to the assemblies of the present invention to modify their properties. Such additives include, but are not limited to, polymeric material, metal, alloys, and combinations thereof. Such additives can be added during the making of the assemblies, or post-production (vide infra).

In some embodiments, significant improvement of mechanical properties of the assembly material can be achieved by introducing (e.g., infusing or infiltrating) various polymer or epoxy binders into the spun nanofiber assemblies (fibers, ropes, sheets, ribbons, or films) during a post-spinning treatment. In one such embodiment, the primary nanofiber assembly is soaked in solutions of various polymers such as poly(vinyl alcohol) (PVA), polystyrene, polyacrylonitrile, and/or different epoxy precursors at room or elevated temperature. Polymer and/or epoxy precursors thereby infiltrated, such as epoxy resins, are optionally reacted to form the polymer or set epoxy. The binders can penetrate the nanofiber network and can couple the nanofibers into a composite matrix. The composite fiber can optionally be subjected to drawing in a wet and/or dry state, which can further increase nanofiber alignment and mechanical strength. For an epoxy resin, this drawing is typically done before the epoxy is fully cured.

Some embodiments of the present invention are directed toward assemblies that are hollow fibers, the hollow fibers comprising nanofibers, the nanofibers generally being selected from the group consisting of single walled carbon nanofibers, multiwalled carbon nanofibers, and combinations thereof, and wherein said hollow fibers are typically greater than one centimeter in length and less than 100 microns in external diameter. In some embodiments, such hollow fibers comprise typically less than 10% by weight, and more typically less than 2% by weight of a polymer that is not present as an impurity in the as-synthesized nanofibers. In some embodiments, the maximum ratio of fiber diameter to fiber wall thickness, for the hollow fiber, is greater than 5. In some embodiments, the hollow fiber comprises single walled carbon nanotubes.

In some embodiments, such hollow fibers are filled with an infiltrating agent selected from the group consisting of a polymer, a polymer precursor that is subsequently polymerized, and combinations thereof. In some or other embodiments, such hollow fibers are filled with an electrolyte selected from the group consisting of solid electrolyte, liquid electrolyte, and combinations thereof.

In some embodiments, the present invention is directed to fibers comprising nanofibers and made by an above-described process. In some such embodiments, said fiber predominantly comprises, by weight, carbon nanotubes. In some such embodiments, said fiber further comprises imogolite nanotubes. In some such embodiments, the fiber comprises less than 2% of polymer that is not present in the as-synthesized nanofibers. In some embodiments, the nanofibers are substantially aligned. In some embodiments, the fiber has an electrical conductivity typically above 10 S/cm and more typically above 100 S/cm In some embodiments, the present invention is directed to apparatus for facilitating implementation of one or more methods of the present invention directed at the spinning of fibers. Such apparatus generally comprise: (a) a spinneret comprising at least one orifice for injecting a spinning solution; (b) an injector for introducing a dispersion of nanofibers into the spinneret; (c) a flocculating liquid feed for continual delivery of flocculation liquid to the dispersion of nanofibers in a spinning tube; (d) a flocculation solution collector that collects the flocculation liquid from the exit of the spinning tube; and (e) a collection means for collecting spun material in a form selected from the group consisting of a spun gel, substantially liquid free fiber, and combinations thereof. In some embodiments, such an apparatus further comprises a wash bath to remove flocculating liquid and impurities. In some such embodiments, said collection means comprises drawing rollers to draw polymer-free carbon nanotube assemblies through the wash bath and onto a winding device. In some such embodiments, the spinneret tube has an opening selected from the group consisting of round, slit-like, and combinations thereof.

In some embodiments, the present invention is directed to devices which use the above-described secondary nanofiber assemblies. Such devices include, but are not limited to, electromechanical actuators, supercapacitors, devices for electrical energy harvesting, electrical heaters, heat exchangers, sensors, batteries, nanofiber-reinforced composites, incandescent light emitters, devices that provide field emission of electrons, electronic textiles, fuel cells, display devices, scaffolds for tissue growth, electronically conducting wires or cables, fluidic circuits, and combinations thereof. In some such embodiments, said secondary nanofiber assembly is a fiber. In some such embodiments, said fiber is electronically conducting. In some such embodiments, the fiber serves a function selected from the group consisting of a supercapacitor, an electromechanical actuator, a battery. In some such embodiments, the fiber serves as an electrode. Some such devices comprise a structure selected from the group consisting of a wire and a fiber, wherein the structure is located within the hollow region of the hollow fibers, and wherein the structure serves as a counter electrode to an electrode that comprises the hollow nanofiber and wherein the counter electrode and electrode are separated by an electrolyte.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
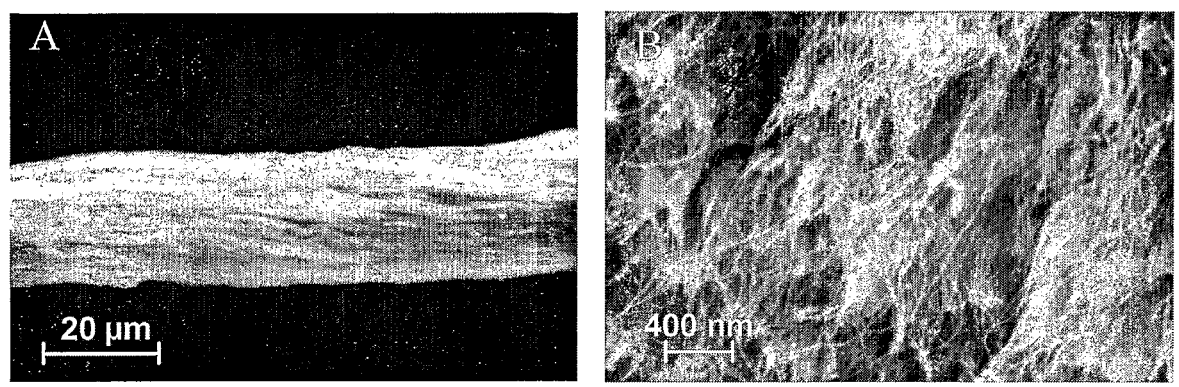
FIGS. 1A and B depict SEM images of sidewall and fracture surfaces, respectively, for fibers of HiPco nanotubes spun by the polymer-free flocculation process, wherein a degree of nanotube alignment is suggested by the sidewall structure (A).

The coagulation spinning processes of the conventional art have the following liabilities that are eliminated by the present invention. First, the prior-art PCS methods produce fibers that comprise substantial amounts of polymer, and this polymer interferes with the ability to obtain high electrical conductivity as well as the applications of fibers made by the PCS methods. None of these methods are capable of directly producing fiber and other shaped articles that comprise almost entirely carbon nanotubes or other types of nanofibers. Because of the presence of polymer binder, electrical conductivity, thermal conductivity, electrochemical activity, and thermal stability of the fibers and other nanofiber assemblies are severely compromised.

The present invention solves the problems associated with the aforementioned prior art processes, by providing an efficient method for spinning nanofiber-containing fibers, wherein the nanofibers have a high loading in the fiber (up to 100%), and wherein such high loadings result in the electrical and mechanical properties, electrochemical activity, and thermal stability needed for key applications.

For the purposes of describing this invention, "nanofibers" are defined as fiber-shaped articles having a diameter in the thinnest dimension of less than 1000 nm. A "fiber" is defined as a fiber-shaped article comprising a number of nanofibers. "Ribbons" are defined as a special type of fiber that has unequal thicknesses in different lateral directions. The term "polymer-free" is applied to an article if no polymer is intentionally added during the fabrication of an article, other than possibly a surfactant used for the dispersion of carbon nanotubes in the initial spinning solution. This definition is applied here to account for the possibility that some methods for synthesizing nanofibers can introduce minor amounts of polymer materials as an impurity. Also, while the surfactants typically used for dispersion of nanotubes are typically non-polymeric, polymeric surfactants can also be usefully employed. In addition, it is sometimes useful to add polymer to either the spinning solution or the flocculation solution. The term "polymer" means a material that principally has one-dimensional covalent connectivity. Materials that have a substantial degree of cross-linking are included in this definition of polymer. The term "solid" means that a material does not comprise a significant quantity of liquid. The term "multiwalled nanofiber" is used to describe both nanofibers that contain more than one wall in the nanofiber geometry, so it includes double-walled nanofibers and excludes single walled nanofibers. No differentiation is made between the terms solution, liquid, and fluid, and all denote a material containing a liquid. Also, the terms "primary assembly" and "primary nanofiber assembly" are used interchangeably, as are the terms "secondary assembly" and "secondary nanofiber assembly." The term primary assembly denotes an item formed by spinning that includes a liquid, which can either be the liquid used for flocculation or a liquid that partially or completely displaces a liquid used for flocculation, prior to the assembly being initially made substantially free of liquid. This liquid can be incorporated in another material to form a gel state. The term secondary assembly denotes a material formed after substantially complete removal of the liquid from the primary assembly, whether or not said secondary assembly is later contacted with a liquid. The term "free of liquid" and like terms denote that an article is substantially free of gel that comprises an easily removable liquid.

This spinning process of some of the invention embodiments will be referred to herein as the polymer-free flocculation spinning (PFFS) process. While most of the description herein will focus on the preparation of polymer-free carbon nanotube fibers, it should be understood that the methods of the present invention are also useful for the preparation of other assemblies such as ropes, ribbons, films, etc. and that the used nanofibers need not be restricted to carbon nanofibers.

In some embodiments, the present invention is generally directed to methods comprising the steps of: 1) dispersing nanofibers in a fluid medium with or without aid of a surfactant to form a dispersion of nanofibers; 2) providing a flocculating solution comprising flocculation agent selected from the group consisting of acids and bases; 3) injecting the dispersion of nanofibers into the flocculating solution such that flocculation occurs to yield at least one assembly comprising nanofibers (primary nanofiber assembly); and 4) removing the flocculation solution or a solution that displaces the flocculation solution to yield at least one nanofiber assembly that is substantially free of liquid (called a secondary nanofiber assembly). This generally-described process can be used to make both nanofiber assemblies that are substantially free of polymer and ones that include polymer.

Types of carbon nanotubes suitable for use with the present invention are not particularly limited, and can generally be made by any process known in the art. HiPco single-walled nanotubes (SWNTs) made with a high pressure carbon monoxide process (such as those made by Carbon Nanotechnologies Inc.), SWNT prepared by the laser ablation process, double-walled nanotubes (such as those made by Nanocyl Inc.), and mixtures of SWNT and multi-walled nanotubes (such as those made by Sunnano Inc.) are very useful for invention embodiments. Unpurified nanotube-rich carbon soot, functionalized nanotubes (such as fluorinated SWNT or carboxylated SWNT) can be used, as can other nanofibers, some of which will be described.

In some embodiments, a combination of carbon nanotubes and nanotubes of another type, such as aluminosilicate nanofibers commonly known as "imogolite," can be spun by methods of the present invention.

Multi-walled carbon nanotubes (MWNTs) and single-wall carbon nanotubes (SWNTs) can be made by a variety of techniques. Laser deposition, chemical vapor deposition (CVD), and the carbon-arc discharge methods are exemplary methods for making the carbon nanotubes, and these methods are well known in the literature (R. G. Ding et al., *Journal of Nanoscietice and Nanotechnology* 1, 7 (2001) and J. Liu et al., *MRS Bulletin* 29, 244 (2004)). Synthetic methods generally result in mixtures of nanotubes having different diameters. Use of catalyst for nanotube synthesis that is close to monodispersed in size (and stable in size at the temperatures used for synthesis) can dramatically decrease the polydispersity in SWNT diameter, and nanotubes having this narrower range of nanotube diameters can be useful for some invention embodiments. S. M. Bachilo et al. describe such a method in *Journal of the American Chemical Society* 125, 11186 (2003).

The nanofibers used for spinning can optionally contain coiled or crimped nanofibers. One benefit of such inclusion is an increase in the elasticity of the articles obtained by spinning, as a consequence of the elasticity of the coiled or crimped nanofibers.

Various methods of separating carbon single wall nanotubes according to electrical properties are useful in some invention embodiments, such as for enhancing achieved electrical conductivity. Examples of known methods for such separation involve: (1) use of charge transfer agents that complex most readily with metallic nanotubes, (2) complexation with selected types of DNA, and (3) dielectrophoresis [R. Krupke et al., *Nano Letters* 3, 1019 (2003) and R. C. Haddon et al., *MRS Bulletin* 29, 252-259 (2004)].

The performance of spun nanotube assemblies, especially carbon nanotube assemblies, can also be optimized by filling component nanotubes or nanotube scrolls with materials to enhance mechanical, optical, magnetic, or electrical properties. Various methods are particularly useful in invention embodiments for filling or partially filling nanotubes. These methods typically include a first step of opening nanotube ends, which is conveniently accomplished using gas phase oxidants, other oxidants (like oxidizing acids), or mechanical cutting. The opened nanotubes can be filled in various ways such as, but not limited to, vapor, liquid, or supercritical phase transport into the nanotube. Methods for filling nanotubes with metal oxides, metal halides, and related materials can be like those used in the prior art to fill carbon nanotubes with mixtures of KCl and $UCl_4$; KI; mixtures of AgCl and either AgBr or AgI; $CdCl_2$; $CdI_2$; $ThCl_4$; $LnCl_3$; $ZrCl_3$; $ZrCl_4$, $MoCl_3$, $FeCl_3$, and $Sb_2O_3$. In an optional additional step, the thereby filled (or partially filled) nanotubes can be optionally treated to transform the material inside the nanotube, such as by chemical reduction or thermal pyrolysis of a metal salt to produce a metal, such as, but not limited to, Ru, Bi, Au, Pt, Pd, and Ag. M. Monthioux has provided [*Carbon* 40, 1809-1823 (2002)] a useful review of these methods for filling and partially filling nanotubes, including the filling of nanotubes during nanotube synthesis. The partial or complete filling of various other materials useful for invention embodiments is described in J. Sloan et al., *J. Materials Chemistry* 7, 1089-1095 (1997).

The nanofibers need not contain carbon in order to be useful for invention embodiments, and a host of processes are well known in the art for making suitable nanofibers. Some examples are the growth of superconducting $MgB_2$ nanowires by the reaction of single crystal B nanowires with Mg vapor [Y. Wu et al., *Advanced Materials* 13, 1487 (2001)], the growth of superconducting lead nanowires by the thermal decomposition of lead acetate in ethylene glycol [Y. Wu et al., *Nano Letters* 3, 1163-1166 (2003)], the solution phase growth of selenium nanowires from colloidal particles [B. Gates et al., *J. Am. Chem. Soc.* 122, 12582-12583 (2000) and B. T. Mayer et al., *Chemistry of Materials* 15, 3852-3858 (2003)], and the synthesis of lead nanowires by templating lead within channels in porous membranes or steps on silicon substrates. The latter methods and various other methods of producing metal and semiconducting nanowires suitable for the practice of invention embodiments are described in Wu et al., *Nano Letters* 3, 1163-1166 (2003), and are elaborated in associated references. Y. Li et al. (*J. Am. Chem. Soc.* 123, 9904-9905 (2001)) has shown how to make bismuth nanotubes. Also, X. Duan and C. M. Lieber (*Advanced Materials* 12, 298-302 (2000)) have shown that bulk quantities of semiconductor nanofibers having high purity can be made using laser-assisted catalytic growth. These obtained nanofibers are especially useful for invention embodiments and include single crystal nanofibers of binary group III-V elements (GaAs, GaP, InAs, InP), tertiary III-V materials (GaAs/P, InAs/P), binary II-VI compounds (ZnS, ZnSe, CdS, and CdSe), and binary SiGe alloys. Si nanofibers, and doped Si nanofibers, are also useful for invention embodiments. The preparation of Si nanofibers by laser ablation is described by B. Li et al. in *Phys. Rev. B* 59, 1645-1648 (1999). Various methods for making nanotubes comprising a host of useful materials are described by R. Tenne in *Angew. Chem. Int. Ed.* 42, 5124-5132 (2003). Also, nanotubes of GaN can be usefully made by epitaxial growth of thin GaN layers on ZnO nanowires, followed by the removal of the ZnO. See J. Goldberger et al., *Nature* 422, 599-602 (2003). Nanofibers having an approximate composition $MoS_{9-x}I_x$, which are commercially available from Mo6 (Teslova 30, 1000 Ljubljana, Slovenia), are included as exemplary compositions (particularly for x between about 4.5 and 6).

Nanoscrolls are especially useful for invention embodiments because Applicants have determined that they can in some cases provide mechanical property advantages over multiwalled nanotubes. These nanoscrolls are individual sheets, or a thin stack of sheets, of a layered material that automatically winds to make a scroll that is structurally analogous to a jelly roll. Almost any sheet-like material can self-assemble into scrolls-as long as the lateral sheet dimension is sufficiently large that the energy gain from non-covalent binding between layers of the scroll sufficiently compensates for the elastic energy cost of forming the scroll. Some examples of materials that have been shown to form nanoscrolls are bismuth, BN, C, $V_2O_5$, $H_2Ti_3O_7$, gallium oxide hydroxide, zinc and titanium oxides, CdSe, $Cu(OH)_2$, selected perovskites, InGa/GaAs and $Ge_xSi_{1-x}$/Si heterolayer structures, and mixed layer compounds like $MTS_3$ and $MT_2S5$ (M=Sn, Pb, Bi, etc.; T=Nb, Ta, etc.). This generality of the scroll formation process for layered materials, from bismuth to carbon and boron nitride, means that there is a host of candidate compositions to choose from for formation of substantially polymer-free flocculation spun fibers, ropes, films, and sheets. Since scrolls can be made by simply exfoliating materials that are presently made in high volume at low cost, polymer-free flocculation spun fibers, ropes, films, and sheets of this invention can also be made at low cost. Methods of synthesizing nanoscrolls of a host of layered materials are known, and these methods can be used in the practice of embodiments of the present invention. See L. M. Viculis, L. M., J. J. Mack, and R. B. Kaner, *Science* 299, 1361-1361 (2003); Z. L. Wang, *Advanced Materials* 15, 432-436 (2003); X. D. Wang et al., *Advanced Materials* 14, 1732-(2002); W. L. Hughes and Z. L. Wang, *Applied Physics Letters* 82, 2886-2888 (2003); J. W. Liu et al., *Journal of Physical Chemistry B* 107, 6329-6332 (2003); and Y. B. Li, Y. Bando, and D. Golberg, *Chemical Physics Letters* 375, 102-105 (2003).

A variety of methods can be usefully employed in invention embodiments for the modification of nanofibers either pre- or post-spinning (such as by a post-spinning chemical derivatization process for carbon MWNTs). Chemical derivatization, physical derivatization, surface coating, or dopant insertion can be practiced before or after spinning, or even after fabrication of the spun nanofiber array into articles or precursors to articles, like woven textiles. An exemplary method for modifying carbon nanotubes is by gas phase reactions and plasma-induced reactions. Fluorination of carbon nanotubes with fluorine gas and plasma induced surface derivatization are useful examples. Useful reaction conditions for carbon nanotube fluorination and plasma-induced derivation are provided, for example, by T. Nakajima, S. Kasamatsu, and Y. Matsuo in *European Journal Solid State Inorganic Chemistry* 33, 831 (1996); E. T. Mickelson et al in *Chem. Phys. Lett.* 296, 188 (1998) and in *J. Phys. Chem. B*

103, 4318 (1999); and Q. Chen et al. in *J. Phys. Chem. B* 105, 618 (2001). Other useful methods that can be used for chemical derivatization of carbon nanotubes are described by V. N. Khabasheshu et al. in *Accounts of Chemical Research* 35, 1087-1095 (2002); by Y.-P. Sun et al. in *Accounts of Chemical Research* 35, 1096-1104 (2002); and by S. Niyogi et al in *Accounts of Chemical Research* 35, 1087-1095 (2002). Since many of these methods decrease the length of single walled nanotubes, there are benefits to applying these methods to double walled and multiwalled carbon nanotubes.

In some embodiments, the nanofibers are optionally coated with a hydrophobic material, like poly(tetrafluoroethylene). One method for such coating on nanofibers is by the decomposition of hexafluoropropylene oxide at about 500° C. on heated filaments (by hot filament chemical vapor deposition) to produce $CF_2$ radicals, which polymerize to produce poly (tetrafluoroethylene) on the surface of individual nanofibers. See K. K. S. Lau et al. in *Nano Letters* 3, 1701 (2003). Related hot filament chemical vapor deposition methods can be used to provide coatings of other polymers, like organosilicones and fluorosilicones. Due to the hydrophobic nature of these coatings, they are typically applied after the fabrication of a spun nanofiber assembly. Various and useful ways to chemically and non-chemically functionalize nanofibers for various applications have been described in the literature and these methods can be applied to the nanofibers and/or the spun nanofiber assemblies of the present invention. See Y. Li, et al., *J. Materials Chemistry* 14, 527-541 (2004).

Since the PFFS fibers, ropes, films, and sheets can be useful for electrochemical applications that benefit from and utilize the extremely high surface area of nanofibers, a number of invention embodiments provide steps in which the primary nanofiber assembly or the secondary nanofiber assembly is infiltrated with solid or gel electrolyte. Examples of such applications include electromechanical artificial muscles, electrochiomic devices, supercapacitors, and batteries. Solid-state electrolytes can also be used advantageously, since such electrolytes enable all-solid-state electrochemical devices. Suitable organic-based solid-state electrolytes include, but are not limited to, polyacrylonitrile-based solid polymer electrolytes (with salts such as potassium, lithium, magnesium, or copper perchlorate, $LiAsF_6$, and $LiN(CF_3SO_2)_2$) and ionic liquids in polymer matrices (which can provide a wide redox stability range and high cycle life for electrochemical processes). Suitable (exemplary) gel or elastomeric solid electrolytes include, but are not limited to, lithium salt-containing copolymers of polyethylene oxide (because of high redox stability windows, high electrical conductivities, and achievable elastomeric properties), electrolytes based on the random copolymer poly(epichloridrin-co-ethylene oxide), phosphoric acid containing nylons (such as nylon 6,10 or nylon 6), and hydrated poly(vinyl alcohol)/$H_3PO_4$. Other suitable gel electrolytes include polyethylene oxide and polyacrylonitrile-based electrolytes with lithium salts (like $LiClO_4$) and ethylene and propylene carbonate plasticizers. The so called "polymer in salt" elastomers (S. S. Zhang and C. A. Angell, *J. Electrochem. Soc.* 143, 4047 (1996)) are also optional and suitable for lithium-ion-based devices, since they provide very high lithium ion conductivities, elastomeric properties, and a wide redox stability window (4.5-5.5 V versus $Li^+$/Li). Optional and well-suited electrolytes for high temperature device applications include ionic glasses based on lithium ion conducting ceramics (superionic glasses), ion exchanged β-alumina (up to 1,000° C.), $CaF_2$, $La_2Mo_2O_9$ (above about 580° C.) and $ZrO_2$/$Y_2O_3$ (up to 2,000° C.). Additional optional and suitable inorganic solid-state electrolytes include AgI, AgBr, and $Ag_4RbI_5$. Some of the proton-conducting electrolytes that are useful in invention embodiments as the solid-state electrolyte include, among other possibilities, Nafion, S-PEEK-1.6 (a sulfonated polyether ether ketone), S-PBI (a sulfonated polybenzimidazole), and phosphoric acid complexes of nylon, polyvinyl alcohol, polyacryamide, and a polybenzimidazole (such as poly[2,2'-(m-phenylene)-5,5'-bibenzimidazole]).

Polymer additives (for application to either the nanofiber primary assembly or nanofiber secondary assembly) that are especially useful for making polymer-free flocculation spun fibers, ropes, films, and sheets composites include polyvinyl alcohol; poly(phenylene tetrapthalamide) type resins (examples Kevlar® and Twaron®); poly(p-phenylene benzobisoxazole) (PBO); poly(p-phenylene benzobisthiozole); and polyacrylonitrile.

Polymers that are pyrolizable to produce strong or highly conductive components can optionally be pyrolized in the nanofiber secondary assembly. Heat treatment and pyrolysis (such as the heat setting in an oxidative environment and further pyrolysis of polyacrylonitrile in an inert environment) is often accomplished while the nanofiber secondary assembly, such as a fiber, is under tension.

Additives for enhancing the electronic conductivities of the nanofiber secondary assemblies of invention embodiments are especially important. Among the suitable materials for enhancing electronic conductivity are (1) elemental metals and metal alloys, (2) electronically conducting organic polymers, (3) and conducting forms of carbon. These additives can be added to the nanofiber secondary assemblies by one or more of a variety of known methods for synthesizing and/or processing these materials, such as by (a) chemical reaction (such as the chemically-induced polymerization of aniline or pyrrole to make, respectively, conducting polyaniline or polypyrrole, the electrode-less plating of metals, and the pyrolysis of a polymer like polyacrylonitrile to make carbon), (b) electrochemical methods for conducting nanofiber secondary assemblies (such as the electrochemical polymerization of aniline or pyrrole to make conducting polymers and the electroplating of metals), and (c) physical deposition methods (such as the vapor deposition of metals, the infiltration of a soluble conducting polymer or a precursor therefore from solution, the infiltration of a colloidal solution of a metal or conducting polymer, or the melt infiltration of a metal). Conducting organic polymers that are suitable for infiltration into nanofiber secondary assemblies include substituted and unsubstituted polyanilines, polypyrroles, polythiophenes, polyphenylenes, and polyarylvinylenes. The synthesis of such suitable conducting polymers is well known and is described, for example, in the Handbook of Conducting Polymers, Second Edition, Eds. T. A. Skotheim, et al. (Marcel Dekker, New York, 1998).

Diamond, diamond-like carbon, and other insulating forms of carbon containing $sp^3$ hybridized carbons (possibly mixed with $sp^2$ hybridized carbons and sp hybridized carbons) are usefully employed herein since they can all serve to insulate nanofiber secondary assemblies, especially conducting fibers, and substantially contribute to the mechanical properties of the product assembly. Infiltration or coating of the electronically conducting nanofiber secondary assemblies with these insulating forms of carbon can be done by CVD processes or by solid-state reaction of infiltrated precursors using thermal and/or pressure treatments. Typical methods that can be employed for formation of such forms of carbon on the surface or interior of nanofiber secondary assemblies are described in A. E. Ringwood, Australian Patent 601561 (1988); Y. S. Ko et al., *J. Mat. Sci.*, 36, No. 2, 469-475 (2001); and J. Qian et al., *J. Mat. Sci.*, 17, 2153-2160 (2002).

For carbon nanofibers, palladium and palladium alloy deposition (chemically, electrochemically, or by evaporation or sputtering) is especially useful for making low resistance ohmic interconnection between nanofibers and between nanofibers and other materials. The use of this metal for minimizing electronic contacts in nanosized electronic devices is described by A. Javey, J. Guo, Q. Wang, M. Lunstrom, and H. J. Dai in *Nature* 424, 654-657 (2003). Palladium hydride formation by the absorption of hydrogen can be employed for tuning work function(s) so as to minimize contact resistances to and between conducting nanofibers like carbon nanotubes.

Depending on the embodiment(s), the concentration of nanofibers in the fibers and other nanofiber assemblies of the present invention can be varied over a wide range, depending upon the composition of the nanofiber dispersion used for spinning, the composition of the flocculation solution, and the composition of other fluid media employed in fabricating the secondary nanofiber assembly. For applications where additives are not useful or are harmful, the concentration of nanofibers in the secondary nanofiber assembly is typically at least 90% of the weight of the nanofiber assembly. More typically for these applications, this weight fraction of nanofibers (together with impurities introduced during nanofiber synthesis) is 98% of the weight of the nanofiber assembly (such as a fiber, rope, ribbon, or film). The nanofiber weight for filled nanotubes includes the weight of materials that are optionally used for partial or complete nanotube filling.

The reason for including the weight of impurities introduced during nanofiber synthesis is that many nanofiber types are synthesized as impure materials, and there are potential cost benefits of using the as-synthesized nanofibers or partially purified nanofibers. Also, there can be performance benefits of using as-synthesized or partially purified nanotubes, since purification processes can degrade nanofiber length and potentially cause undesired chemical derivatization of the nanofibers.

The preparation of the dispersions used for nanofiber spinning is optionally conducted using additives in the dispersion (dispersion aids) that are surfactants or materials that function as surfactants. Examples of suitable aids for facilitating nanofiber dispersion include, but are not limited to, sodium or lithium dodecylsulfate, octylphenol ethoxylate, sodium dodecylbenzenesulfonate, sodium dodecylsulfonate, sodium n-lauroylsarcosinate, a sodium alkyl allyl sulfosuccinate, the sodium salt of poly(styrene sulfonate), charged colloidal particles, and combinations thereof. The use of charged colloidal nanoparticles for carbon nanotube dispersal is described by J. Zhu et al. in *J. Phys. Chem.* (2004). As an example, especially for embodiments involving spinning nanotubes, HiPco single walled nanotubes in the amount of about 0.6 wt % are dispersed in an aqueous solution comprising about 1.2 wt % lithium dodecyl sulfate (LDS) surfactant using a horn-type ultra-sonicator.

The present invention is drawn, in part, to processes of making dispersions comprising long nanofibers (such as carbon nanotubes) that are suitable for spinning, since they do not contain large nanofiber aggregates. Said processes may comprise one of the steps of separating nanofibers (that are poorly dispersed or undispersed nanofibers in their unseparated form) by centrifugation of the nanofiber dispersion followed by removal of the nanofibers that are poorly dispersed or undispersed, and separating the liquid region containing primarily the undispersed or poorly dispersed nanofibers from the liquid region containing better dispersed nanofibers; a step of densification of the fraction comprising long bundles by evaporating the solvent; separating large nanofiber aggregated from better dispersed nanofibers by using filtration, wherein only the better dispersed nanofibers are able to pass readily through the chosen filter pore size; and a step of filtrating the suspension to remove nanotube aggregates that were not dispersed.

The suitability of flocculants for the present spinning processes can be initially evaluated using a simple sedimentation test. In the course of the tests, various acids or bases can be added to small amounts of nanofiber dispersion for evaluation or their ability to serve as flocculation liquids. For example, Applicants find that hydrochloric, sulfuric, nitric, and phosphoric acids, and NaOH and KOH bases, cause almost instantaneous aggregation of carbon nanotube dispersions that use lithium dodecylsulfate as surfactant. The density and texture of the sediment upon visual inspection reveals some dependence on the type and concentration of the flocculating agent. Also, the type of surfactant used in dispersing the carbon nanotubes has some importance; good results for LDS suspensions were obtained using concentrated hydrochloric acid.

In an embodiment of the present invention (e.g., a PFFS process), a round glass container can be filled with flocculating agent, e.g., 37% hydrochloric acid, set on a turntable and rotated at a constant speed (e.g., 33 rpm). Using a syringe and a needle with a clean cylindrical opening, a narrow jet of nanotube dispersion can be injected into a flow of the acid solution, which at close to the point of injection causes aggregation and partial alignment of nanotubes into a polymer-free nanotube fiber gel. The acid, acting as the flocculant aid, efficiently suppresses the dispersing action of the surfactant, promoting aggregation and providing support for a gel fiber forming in the liquid flow. The concentration of the agent needs to be high enough to suitably satisfy the requirement of fast surfactant neutralization.

In some embodiments, the nanotube gel fiber is collected in a receiving bath or transferred directly into a wash vessel where the flocculating solution is completely removed by washing the fiber in aqueous solutions of methanol, ethanol or other solvents. Finally, the fiber is pulled out of the wash bath, stretched over a sturdy frame, and dried under tension so that gel forms a fiber having a strength that is improved relative to the case where the gel fiber is dried while not under tension. Drying under tension typically increases the alignment of nanotubes in the fiber and in other secondary nanofiber assemblies.

In order to improve the degree of alignment of nanotubes, and as a consequence mechanical properties of the fiber, the fiber can be drawn in a wet state, dried, and re-drawn in a dry state. The conditions for the drawing procedure are not particularly limited, although the use of the highest degree of elongation compatible with reliable processing (free of unintended gel fiber or dried fiber rupture) is generally desirable in order to optimize the degree of nanofiber orientation, and thereby the mechanical strength and modulus of the fiber. Optionally, the dry fiber can be subjected to a steam treatment in order to be re-drawn in a wet state. In order to obtain increased mechanical strength, via the enabled higher draw in the dried state, the primary nanofiber assembly is preferably infiltrated with a polymer like poly(vinyl alcohol) prior to drying. This polymer can optionally be removed after stretching, such as by pyrolysis. A solution process can also be used for removal of polymer, but such processes alone typically result in incomplete polymer removal.

In some embodiments, the secondary nanofiber assembly is subjected to a post spinning treatment. One example of a post spinning treatment is treatment of the secondary nanofiber assembly at an elevated temperature, typically between 100° C. and 2000° C., although higher temperatures can sometimes be usefully employed (especially when the nanofibers are multi-walled carbon nanofibers). For nanofibers that are reactive in the atmosphere at high temperatures, vacuum or inert atmosphere protection at these temperatures can be usefully employed. For some nanofibers (such as single wall carbon nanotubes) and some nanofiber applications, this annealing is carried out at a temperature between about 100° C. and 1500° C. For carbon nanotubes, this annealing provides for graphitization of any organic constituents that may be present in the fiber, development of carbon-carbon contacts in nanotube junctions, and perhaps cross-linking between individual bundles. At optimum conditions, annealing of the fiber can result in improvement of electrical, mechanical, and electrochemical properties of the secondary nanofiber array.

Significant improvement of mechanical properties of the material can be achieved by introducing (e.g., infusing) various polymer or epoxy binders into the spun nanofiber arrays (fibers, ropes, sheets, ribbons, or films) during a post-spinning treatment. In one type of such embodiment, the primary nanofiber assembly is soaked in solutions of various polymers such as poly(vinyl alcohol) (PVA), polystyrene, poly(phenylene tetrapthalamide) type resins (examples Kevlar® and Twaron®); poly(p-phenylene benzobisoxazole) (PBO); poly (p-phenylene benzobisthiozole); polyaciylonitrile, and/or different epoxy precursors at room or elevated temperature. Polymer and/or epoxy precursors thereby infiltrated, such as epoxy resins, are optionally reacted to form the polymer or set epoxy. The binders can penetrate the nanofiber network and can couple the nanofibers into a composite matrix. The composite fiber can optionally be subjected to drawing in a wet and/or dry state, which can further increase nanofiber alignment and mechanical strength. For an epoxy resin, this drawing is typically done before the epoxy is fully cured.

Figure 5:
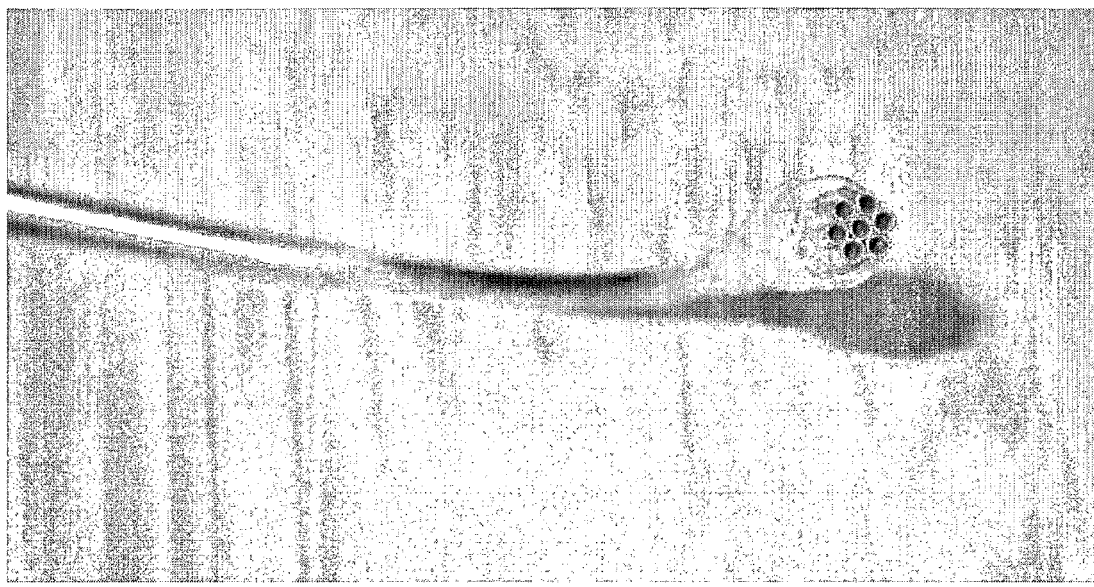
FIG. 5 is a photograph of an assembly of individual spinneret tubes used in accordance with some embodiments of the present invention.

The present invention is drawn, in part, to an apparatus for preparing structures (nanofiber assemblies) comprising aligned nanofibers, said apparatus generally comprising a spinneret built from one or a number of spinning orifices (such as capillaries) with small inner diameter arranged in such a manner as to create a high shear force on the dispersion to optionally align the carbon nanotubes in the general direction of the flow. FIG. 5 illustrates a multi-tube spinneret suitable for use with some embodiments of the present invention.

Figure 8:
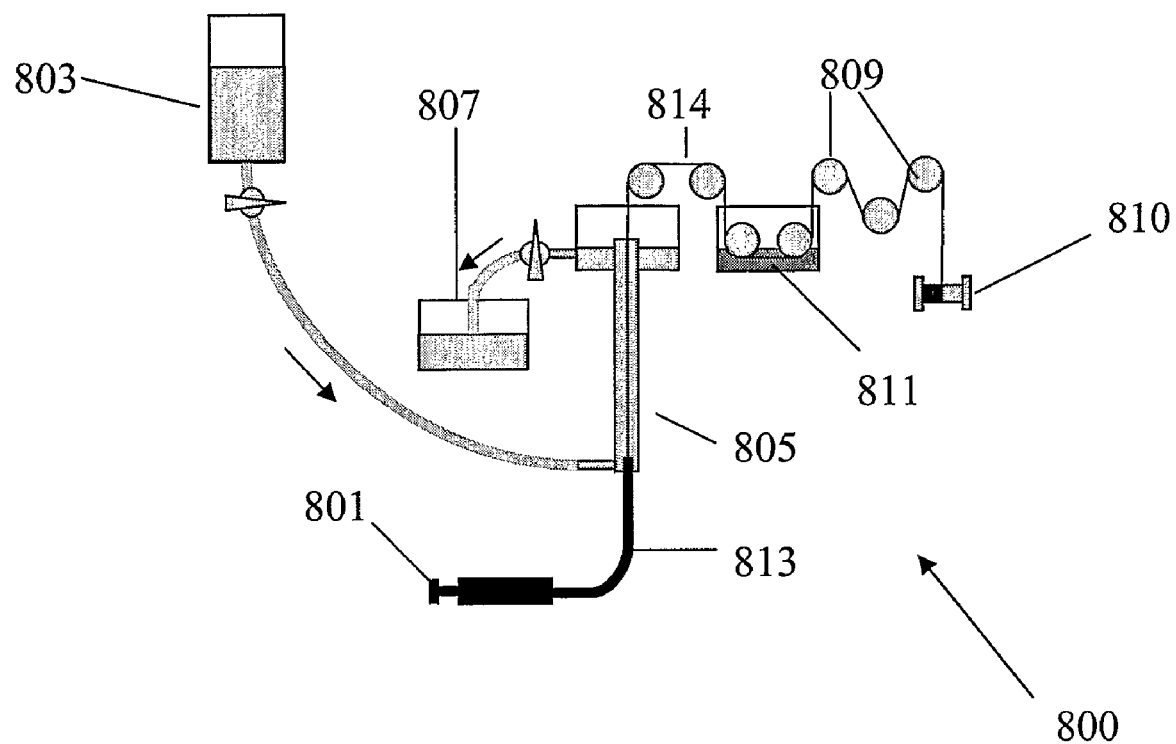
FIG. 8 is a schematic diagram of a spinning apparatus that is useful in accordance with some embodiments of the present invention.

The following description of the apparatus refers to FIG. 8, which shows a simplified design of a single capillary spinning machine with a vertical spinning tube 805; however, the apparatus can have multiple capillaries, e.g., well over a thousand capillaries, and a horizontal or tilted spinning tube. Such apparatus (800) comprise a nanotube dispersion flocculating agent feed 803 and a flocculation solution collector 807 that provide spinning solution flow through the spinning tube 805 at a desired rate. Various means known in the art can be used to control the injection rate of the dispersion into the flocculation solution, as well as the flow rate of the flocculation solution, and the flocculation solution is typically cycled between the flocculation solution collector (807) and the flocculation solution feed (803) and optional purification means can be provided between the flocculation solution collector and the flocculation solution feed. In some embodiments, the dispersion of carbon nanotubes is introduced into the spinning tube through a needle-like spinneret 813 with an injector 801 producing a gel fiber 814. The gel fiber is then removed from the spinning tube with the aid of rollers 809, washed in an optional wash bath 811, dried, and drawn with drawing rollers 809 and wound on a spool 810 using a winding device (not shown). Heating means can be provided to accelerate the drying of the gel fiber. By tuning the relative flow rate of the flocculating agent and the carbon nanotube dispersion, the degree of alignment of the carbon nanotubes in the direction of the flow can be adjusted. Variation of the shape and dimensions of the spinneret outlet can be used to alter the shape of the gel fiber and the substantially liquid-free fiber obtained by drying the gel fiber. A rope can be optionally assembled by collecting the output from multiple spinning orifices in one article.

A ribbon-like texture is typical for gel fibers spun by the PFFS process, even when the capillary diameter is largely cylindrical. Depending upon orifice diameter and cross-section geometry, as well as spinning rate and spinning solution and flocculation solution composition, the dried gel fiber takes one of the following forms: a hollow fiber with at least an approximately cylindrical cross-section, a laterally folded ribbon, a rod with an approximately rectangular cross-section, a rod with an approximately round cross-section, or any combination thereof.

The present invention is drawn, in part, to largely liquid free fibers that are hollow with an approximately cylindrical cross-section, a folded ribbon, a rod with an approximately rectangular cross-section, and a rod with an approximately round cross-section, and combinations thereof, wherein the fibers comprise carbon nanotubes that are partially oriented in the fiber direction. Hollow fibers can be optionally filled with different constituents such as ionic liquid containing compositions that can be chemically or electrochemically polymerized to form an electrolyte that is useful for electrochemical application, such as for supercapacitors.

Figure 9:
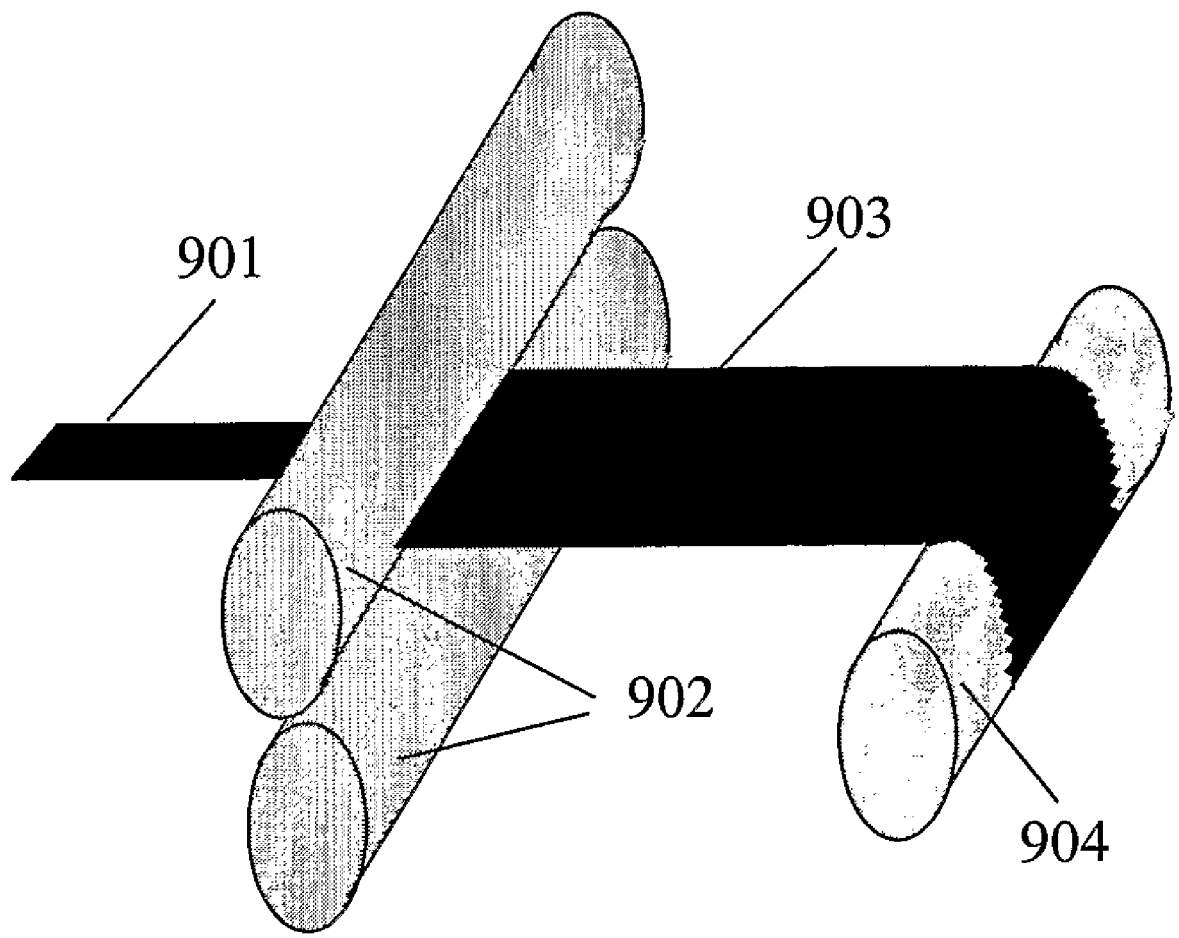
FIG. 9 is a schematic diagram of compression rollers aimed at production of carbon nanotube ribbon in accordance with some embodiments of the present invention.

The present invention is drawn, in part, to carbon nanotube ribbons that are produced by PFPS process using apparatus similar to the one schematically shown in FIG. 8. In order to preserve ribbon-like texture of the material, compression rollers depictured in FIG. 9 can be employed. Referring to FIG. 9, an as-spun gel carbon nanotube fiber 901 passes between cylinders 902 that rotate in opposite directions and are separated by the distance that is substantially less than the initial thickness of the primary fiber assembly. The rollers squeeze the gel fiber into a thin sheet-like layer 903 that is optionally washed, dried and drawn so that continuous ribbon can be collected on winding device 904. The rollers may operate at room or elevated temperature in an atmosphere that contains vapors of water and organic solvents aimed at maintaining integrity. A number of ribbons can be combined in a composite multilayer structure that may be reinforced and optionally laminated with polymer films. Alternatively several narrow ribbons can be joined in a wide continuous nanotube sheet resembling in functionally sheets of "bucky paper."

The present invention is drawn, in part, to a material of carbon nanotube assemblies exhibiting high electrical conductivity, high specific capacitance in electrolytes, and excellent electromechanical response. A substantial degree of alignment of carbon nanotubes in such produced material is observed using polarized Raman measurements.

The advances disclosed herein enable the carbon nanotube (and generally other nanofiber) assemblies to be used in electronic textiles, actuators, supercapacitors, friction materials, high-temperature heaters, heat exchangers, sensors, and fiber-reinforced composites. Carbon nanotube films and ribbons prepared by similar PPFS procedures can be considered to be alternatives to carbon nanotube sheets. Because of their extremely large surface area, these films can be utilized in gas storage equipment and gas sensors and are promising for biomedical applications, such as tissue scaffolds. Also, fibers, woven textiles, ribbons, and films can work as components of various composites, such as epoxy/carbon nanotube composites.

Such materials (fibers, ropes, ribbons, and films) comprising carbon nanotubes have properties needed for multifunctional applications where significant mechanical strength is combined with other functional properties, such as actuation, mechanical energy harvesting, mechanical dampening, thermal energy harvesting, and energy storage.

The nanotube structures of the present invention can be utilized for the concentration and storage of gases. The fiber or ribbon geometry is useful for this application because it keeps the nanotubes in place (i.e., the nanotubes won't leave with the gas when the condensed gas converted to non-condensed gas and withdrawn from the concentration or storage vessel or means). The gas storage system can be an annular nanotube body made by winding the nanotube fiber or ribbon on a mandrel. This annular body would be contained in a cylindrical pressure vessel with a gas inlet/outlet port. An external or internal heater would be used for desorbing the stored gas. Electrical desorption of a stored gas is possible by electrical means using, for example, the resistive heating of fibers comprising conducting nanofibers (such as carbon nanotubes).

The actuators enabled by the fibers, ribbons, sheets, and films of this invention may be used for the conversion of electrical energy to mechanical energy, as well as the conversion of mechanical energy to electrical energy. The applications for these mechanical actuators are diverse and include, for example, robotic devices, high temperature air flow valves for aircraft engines, optical switches for optical fiber interconnects, adjustable structures for vibration suppression and failure avoidance, phase shifters for optical gyroscopes, precision electronic gyroscopes, and artificial muscles for space suits. These electromechanical actuators, made possible by the nanotube assemblies of the present invention, can provide (a) high stress-generation capabilities, (b) high gravimetric and volumetric work capabilities per cycle, and (c) high volumetric and gravimetric power generation capabilities. Additionally, such actuators can operate at low voltages that provide savings in device electronics, avoid potential safety hazards, and minimize electromagnetic interference effects.

The carbon nanotube fibers of the present invention can also be used for carrying high currents. This capacity to carry high currents results from the combination of their reasonably high electrical conductivities and from their high thermal conductivity and stability (enabling substantial heating and conduction of produced heat from the fibers). The present invention provides carbon nanotube-containing fibers for use as windings on a mandrel (with optional heat set on the mandrel), enabling an exemplary use of the carbon nanotubes as motor windings, electromagnet windings, and the winding for transformers.

By adjusting the injection rate of the nanotube dispersion into the flocculating solution, the diameter of the spinneret opening, and the velocity of the coagulating liquid, the shear force imposed on the nanotubes can be adjusted. Typically, the inner diameter of the spinneret tube is less than 0.0195" (21G), and more typically less than 0.0095" (25G). This diameter and shear flow of the nanotube dispersion into the flocculating (coagulating) solution is operable for aligning the carbon nanotubes in the direction of the flow.

The following discussion more fully elaborates on the applications of the nanofiber assemblies, and of processes for the modification of these nanofiber assemblies for these applications.

Electronically conducting fibers of invention embodiments (comprised of conducting nanofibers, such as carbon nanotubes) are especially useful as the conducting fibers for electronic textiles. These fibers can be used both to provide a mechanical function and an electronic function. For example, these fibers can be configured as antennas that can be woven or otherwise incorporated into textiles employed for clothing. These antennas can be used to transmit voice communications and other data, such as information on the health status, location of the wearer, and her/his body motions, as well as information collected by the wearer or by sensor devices in the clothing. The configurations employed by such antennas can be essentially the same as for conventional antennas, except that the PFFS fiber antennas can be woven or sown into the clothing textile.

Replacing metal wires in electronic textiles with PFFS fibers can provide important new fainctionalities, like the ability to actuate as artificial muscles and to store energy as a fiber supercapacitor or battery. Also, for example, conducting fibers of some embodiments of this invention can be used as wires for sensors and for clothing that contains liquid crystal displays or light emitting elements (such as light emitting diodes). Similar methods can be employed for creating device structures from conventional wires and from these PPFS fibers, and guidance as to the application modes of these conventional wires is provided by E. R. Post et al. in *IBM Systems Journal* 39, 840-860 (2000).

PPFS fibers made of superconductors, like nanofibers having the approximate composition $MoS_{9-x}I_x$ (where x between about 4.5 and 6) can be used as superconducting cables and as superconducting wires for magnets. Nanofibers of the $Nb_3Sn$ superconductor, the $MgB_2$ superconductor (which has a superconducting transition temperature of about 39 K), and the carbon doped $MgB_2$ superconductor are especially suitable for use as component nanofibers for the fibers of invention embodiments that superconduct. See Y. Wu et al., *Advanced Materials* 13, 1487 (2001), where the growth of superconducting $MgB_2$ nanowires by the reaction of single crystal B nanowires with the vapor of Mg is described.

If desired, for applications like electron field emission, the density of these stray nanofibers can be selectively increased in different regions of the fiber by mechanical treatments or chemical treatments, including chemical treatments that result in nanofiber rupture. Examples of such mechanical treatments are, for example, abrasion between fibers and a rough surface or orifice and the ultrasonication of a PFIFS fiber (optimally while tension is applied to the fiber). Examples of such chemical processes are treatment in oxidizing acids, plasma oxidation, oxidation in air, and surface fluorination (which can be later reversed by thermal annealing).

The PFFS fibers can be used as wires, and wires capable of carrying high currents. These fibers, and especially these fibers containing a conductivity enhancement aid, are especially useful for the transport of electrical currents. Advantages obtained for PFPS fibers spun from carbon nanotubes are high current carrying capacity, high temperature stability, and freedom from electro-migration effects that cause failure in small diameter copper wires. Other potential applications are, for example, as power cables and as the windings of magnets, transformers, solenoids, and motors.

Because of the high porosity achievable in the PFFS fibers that are substantially polymer free, and the high electrical conductivity demonstrated herein for particular fibers (those based on carbon nanotubes), these fibers are useful as electrodes for electrochemical devices that use either electrochemical double-layer charge injection, faradaic charge injection, or a combination thereof. These devices could utilize either electrolytes that are liquid, solid-state, or a combination thereof (see above discussion of electrolytes).

Examples of PFPS fiber-based electrochemical devices of this invention include supercapacitors, which have giant capacitances in comparison with those of ordinary dielectric-based capacitors, and electromechanical actuators that could be used as artificial muscles for robots. Like ordinary capacitors, carbon nanotube supercapacitors [A. B. Dalton et al., Nature 423, 703 (2003)], and electromechanical actuators [R. H. Baughman et al., Science 284, 1340 (1999)] comprise at least two electrodes separated by an electronically insulating material that is ionically conducting in electrochemical devices. The capacitance for an ordinary planar sheet capacitor inversely depends on the inter-electrode separation. In contrast, the capacitance for an electrochemical device depends on the separation between the charge on the electrode and the countercharge in the electrolyte. Because this separation is about a nanometer for nanotubes in electrodes, as compared with the micrometer or larger separations in ordinary dielectric capacitors, very large capacitances result from the high nanotube surface area accessible to the electrolyte. These capacitances (typically between 15 and 200 F/g, depending on the surface area of the nanotube array) result in large amounts of charge injection when only a few volts are applied. This charge injection is used for energy storage in nanotube supercapacitors and to provide electrode expansions and contractions that can do mechanical work in electromechanical actuators. Supercapacitors with carbon nanotube electrodes can be used for applications that require much higher power capabilities than batteries and much higher storage capacities than ordinary capacitors, such as hybrid electric vehicles that can provide rapid acceleration and store braking energy electrically.

Various methods can be employed for effectively employing the PFFS fibers of invention embodiments in thermochromic devices, including those that are woven or otherwise arrayed in electronic textiles. One method is to use the PFFS fibers as heating elements to cause the color change of a thermochromic material that is overcoated or otherwise incorporated into the fiber.

Another method is to utilize electrochemically-induced color changes of an electronically conducting PFFS fiber working electrode that is infiltrated or coated with an electrolyte. For this method, the counter-electrode can be another PPPS fiber that contacts the same electrolyte as does the working electrode, but other useful possibilities exist. For example, the counter-electrode can be an electronically-conducting coating on the textile that is separated from the PFFS fiber by the ionically-conducting electrolyte that is required both in order to avoid inter-electrode shorting and to provide an ion path. The electrochemically-induced chromatic change of the PFFS fiber in either the infrared, visible, or ultraviolet regions can involve either faradaic processes or non-faradaic charge injection, or any combination thereof.

Electronically conducting PFFS fibers overcoated or infiltrated with a conducting organic polymer are especially useful for color change applications, and especially as fiber electrodes that provide color changes in electronic textiles. The FFFS fibers are optionally used as electrodes that change color when electrochemically charged either faradaically or non-faradaically. These chromatic changes occur for the carbon nanotube fibers in the useful region in the infrared where the atmosphere is transparent.

Using these chromic materials, electronic textiles that provide pixilated chromatic changes can be obtained. Methods for electronically addressing individual pixels are widely used for liquid crystal displays and are well known, and the same methods can be used here. For example, applying a suitable potential between the ends of different PFFS fibers in a textile will selectively heat a thermochromic material which separates these fibers (and has a much lower electrical conductivity than the PFFS fibers).

Conducting PFFS fibers are especially useful as fuel cell electrodes that are filled with electrolyte and contain catalyst. Because of their strength, toughness, high electrical and thermal conductivities, and porosity, the PFFS fibers are included among the suitable compositions for fuel cell applications. A fuel cell electrode can comprise a PFFS fiber (together with a penetrating electrolyte and a catalyst such as Pt), or it can comprise an array of PPFS fibers, especially including those that have been woven (or otherwise configured) into a textile.

PFFS fibers wrapped on a mandrel are especially suitable for many of the above applications. This mandrel can be one that is part of the final device or can be one that is used for arraying the PPFS fiber, and then removed in following fabrication steps.

The PFFS fibers of invention embodiments have special utility as chemical and mechanical sensors that can be optionally woven into textiles. These fibers can also be incorporated into composite structures to sense mechanical deformation of these structures and the occurrence of damage-causing events (before they result in catastrophic structure failure). The mechanical sensor application can use the change in fiber electrical conductivity that occurs when the fiber is deformed, or the interruption in electronic transport that occurs when the fiber is broken. For example, PFFS fibers in a soldier's uniform could provide an electronically transmissible signal indicating that a soldier has been wounded at a particular location, thereby enabling effective triage. Also, the toughness of the PFFS fibers that have been subsequently filled with polymer could provide some degree of protection against injury.

Chemical sensor applications of the PPFS fibers can utilize the sensitivity of electronic transport and thermopower to sense the absorption of chemical species on the nanofibers, as well as the reaction of chemicals or biological agents with derivatized or non-derivatized surfaces. This sensitivity of carbon nanotube electrical conductivity and thermal power is well known. See P. G. Collins, K. Bradley, M. Ishigami, and A. Zettl, Science 287, 1801 (2000) and J. Kong et al., Science 287, 622 (2000). The benefit that the PFFS fibers provide is retention of the high surface area of the nanofibers and obtainable mechanical properties suitable for being incorporated in a variety of configurations, including as chemical sensors in electronic textiles. Functionalization of carbon nanotubes used for fiber spinning and incorporation of some additives into such fibers that selectively react with chemicals can make the sensor response specific in respect to particular agents. In particular, carboxylation of SWNT ends and inclusion of metal particles that are known to possess strong catalytic activity (platinum, palladium, ruthenium, their alloys, biological catalysts, etc.) provide enhancement of sensitivity and selectivity of PPFS sensors.

Nanofibers, and in particular carbon nanofibers, are well known to be useful as field emission electron sources for flat panel displays, lamps, gas discharge tubes providing surge protection, and x-ray and microwave generators. See W. A. de Heer, A. Chactelain, D. Ugarte, Science 270, 1179 (1995); A. G. Rinzler et al., Science 269, 1550 (1995); N. S. Lee et al., Diamond and Related Materials 10, 265 (2001); Y. Saito, S. Uemura, Carbon 38, 169 (2000); R. Rosen et al., Appl. Phys. Lett. 76, 1668 (2000); and H. Sugie et al., Appl. Phys. Lett. 78, 2578 (2001). A potential applied between a carbon nanotube-containing electrode and an anode produces high local fields as a result of the small radius of the nanofiber tip and the length of the nanofiber. These local fields cause electrons to tunnel from the nanotube tip into the vacuum. Electric fields direct the field-emitted electrons toward the anode, where a phosphor produces light for flat panel display applications and (for higher applied voltages) collision with a metal target produces x-rays for x-ray tube applications. In order to increase the number of nanotube fibers on the PFFS fiber surface that are available for field-enhanced electron emission, the fiber surface can be intentionally abraded by mechanical processes, chemical processes or combinations thereof.

As another example of an application mode in the electron emission source area, the PFFS fibers can be usefully employed as electron-emitting elements for an x-ray endoscope for medical exploration, or as a central electron emission element for a cylindrically-shaped high-intensity light source, where the emission phosphor is on a cylinder that is external to, and optionally approximately coaxial with, the central PFFS fiber. Carbon nanotubes are especially suitable for inclusion in PFFS fibers used in field emission applications.

It is well known that carbon nanotube fibers can be used as incandescent light sources. See K. Jiang et al. in *Nature* 419, 801 (2002) and in U.S. Patent Application Publication No. US 2004/0051432 A1 (Mar. 18, 2004); P. Li et al. in *Applied Physics Letters* 82, 1763-1765 (2003); and J. Wei et al in *Applied Physics Letters* 84, 4869-4871 (2004). However, the achievable mechanical properties of the PPFS fibers of the present invention can translate into increases in the lifetime of the incandescent filament and to the degree of repeated mechanical shock that the incandescent filament can withstand without failure.

Catalyst particles such as metal or metal alloy particles can be incorporated in the volume (or on the surface) of an electronically conducting PFFS fiber (either by incorporating these particles in the nanofiber dispersion, the flocculation liquid, a liquid that displaces the flocculation liquid, or by other means). Well known chemical vapor deposition (CVD) methods can be used to grow nanofibers from these catalyst particles (see references below) that extend from the PFFS fiber, so as to provide field emitting nanofibers. These nanofibers are typically carbon nanotubes.

Growth of nanofibers within or on the PPFS fibers of invention embodiments is likely to be more generically useful than for the purpose of fabricating an electron field emission element. These methods can be used for such purposes as (a) mechanical reinforcement of the fiber, (b) enhancing the electronic or thermal conductivity of the fiber, and (c) providing nanofibers that extend from the PFFS fiber to thereby electronically, thermally, or mechanically interconnect this fiber with surrounding elements (such as other PPFS fibers, other fibers or yarns, or a matrix material). These processes involve the steps of (1) incorporating active catalyst particles in a PFFS fiber, and (2) synthesizing nanofibers in a PFFS fiber or on the surface of a PFFS fiber by reaction catalyzed by the introduced catalyst particles. If this PFFS fiber is incorporated into a textile, this particle-catalyzed growth of nanofibers within or on the PFFS fiber can be either before or after this PPFS fiber is incorporated into a textile or other fiber array. This synthesis of nanofibers using catalyst particles can be by CVD, liquid phase synthesis, or other known means. Useful catalysts and carbon nanotube growth methods that can be employed are described, for instance, in R. G. Ding et al., *Journal of Nanoscience and Nanotechnology* 1, 7 (2001); J. Liu et al., *MRS Bulletin* 29, 244 (2004); and S. M. Bachilo et al. *Journal of the American Chemical Society* 125, 11186 (2003). Catalysts and growth methods for other nanofibers are described, for instance, by Y. Wu et al., in *Advanced Materials* 13, 1487 (2001); R. Tenne in *Angew. Chem. Int. Ed.* 42, 5124-5132 (2003); and X. Duan and C. M. Lieber in *Advanced Materials* 12, 298-302 (2000), where semiconductor nanofibers having high purity are made using laser-assisted catalytic growth.

The PFFS fibers, sheets, ropes, and ribbons of invention embodiments can also be used as scaffolds for the growth of tissue in either culture media or in organisms, including humans. Examples of possible application include use of the PFFS fibers, sheets, ropes, and ribbons as scaffolds for neuron growth after brain or spinal cord injury. Recent work has shown [H. Hu, Y. Ni, V. Montana, R. C. Haddon, V. Parpura, *Nano Letters* 4, 507 (2004); J. L. McKenzie et al., *Biomaterials* 25, 1309 (2004); and M. P. Mattson et al, *J. of Molecular Neuroscience* 14, 175 (2000)] that functioning neurons readily grow from carbon nanotubes, and that carbon fibers having diameters of about 100 nm or less retard scar growth and facilitate desired cell growth. For the purposes of modifying biocompatibility, the spun nanotubes in PFFS fibers, sheets, ropes, and ribbons can optionally be chemically derivatized or non-chemically derivatized, such as by wrapping with DNA, polypeptides, aptamers, other polymers, or with specific growth factors like 4-hydroxynonenal. The PFFS fibers, sheets, ropes, and ribbons of invention embodiments can be produced free of any additives (but desired additives can be incorporated and the component nanofibers can be derivatized) and can be obtained in highly electrically-conducting forms (like the illustrated case in the examples for carbon-nanotube-based PFFS fibers), and can be usefully strong. These PFFS fibers can be woven into either two or three dimensional textiles that could serve as frameworks for the growth of blood vessels and nerves, such frameworks being, for example, tubular structures.

One major problem in using scaffolds for tissue growth is in insuring appropriate elasticity of the scaffold both during tissue growth, and after such growth has been largely accomplished. The situation is like the case of a broken bone— immobilization is desirable during the healing process, but it is desirable that normal mobility and elasticity returns after the healing process has satisfactorily progressed. The PFFS fibers, ropes, and sheets provide this tunability of elasticity if the initial scaffold material is impregnated with a host material (such as a relatively rigid bioabsorbable polymer), whose bio-regulated absorption enables the PFFS nanofiber assembly to have the elasticity associated with normal body function and mobility.

The porosity, high surface area, small achieved diameters, and useful mechanical strength of PFFS fibers of invention embodiments made them ideal absorptive materials for concentrating and storing gas and liquid components. For this application the PFFS fibers are typically uninfiltrated with polymer or other materials, since such infiltration can possibly interfere with the infiltration and absorption desired during this type of application.

The high electrical conductivity for substantially polymer free PFFS fibers made of such materials as carbon nanofibers facilitates their use as a material for gas component separation, concentration, and analysis. In a typical process using these conducting materials for this purpose, the PPFS fiber of fiber assembly is exposed to the analyte for a time enabling separation and concentration by absorption on the giant surface area of small diameter nanofibers and nanofiber bundles. This absorbed material can then be released by heating the PFFS fiber electrically, by radiofrequency or microwave absorption, or by the absorption of radiation at ultraviolet, visible, or infrared wavelengths.

The porosity of substantially polymer-free PFFS fibers can be usefully employed for using these fibers as channels in microfluidic circuits. These microfluidic circuits can be employed, for example, to make centimeter scale or smaller "fiber laboratories" for chemical and biochemical analysis or, more exclusively, for chemical synthesis.

The novelty in the above case is to use the wicking capability of substantially polymer-free PFFS fibers for the transport of chemicals for subsequent possible mixing and chemical reaction, separation (optionally along fiber lengths), and chemical analysis.

These and many other types of microfluidic circuits based on substantially polymer-free PFFS fibers can optionally be arrayed on a curved or linear surface to make the final device configuration. As another exemplary configuration, these microfluidic fibers can be optionally woven, sewn, embroidered, or otherwise configured in a textile. To better define the microfluidic circuit, a fraction of the PFFS fibers can be made substantially non-interacting with the microfluidic circuit, such as by appropriately choosing (or modifying) their hydrophobicity/hydrophilicity and/or porosity. These PFFS fibers used in microfluidic circuits can optionally comprise more than one textile layer, and microfluidic PFFS fibers in one textile layer can optionally transverse between textile layers. Such microfluidic circuits can be used for various purposes as, for example, in textiles in clothing that analyze biological products for health monitoring purposes. Also, microfluidic circuits based on PFFS fibers can be used for mixing fuel and oxidant for miniature fuel cells and combustion engines, so these microfluidic circuits could be used for miniature robots or micro-air vehicles.

The following examples are provided to more fully illustrate some of the embodiments of the present invention, and to show by way of illustration how the inventive structure comprising polymer-free carbon nanotube assemblies can be prepared and utilized and should not be construed as limiting the invention in any way. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

EXAMPLE 1

Figure 2:
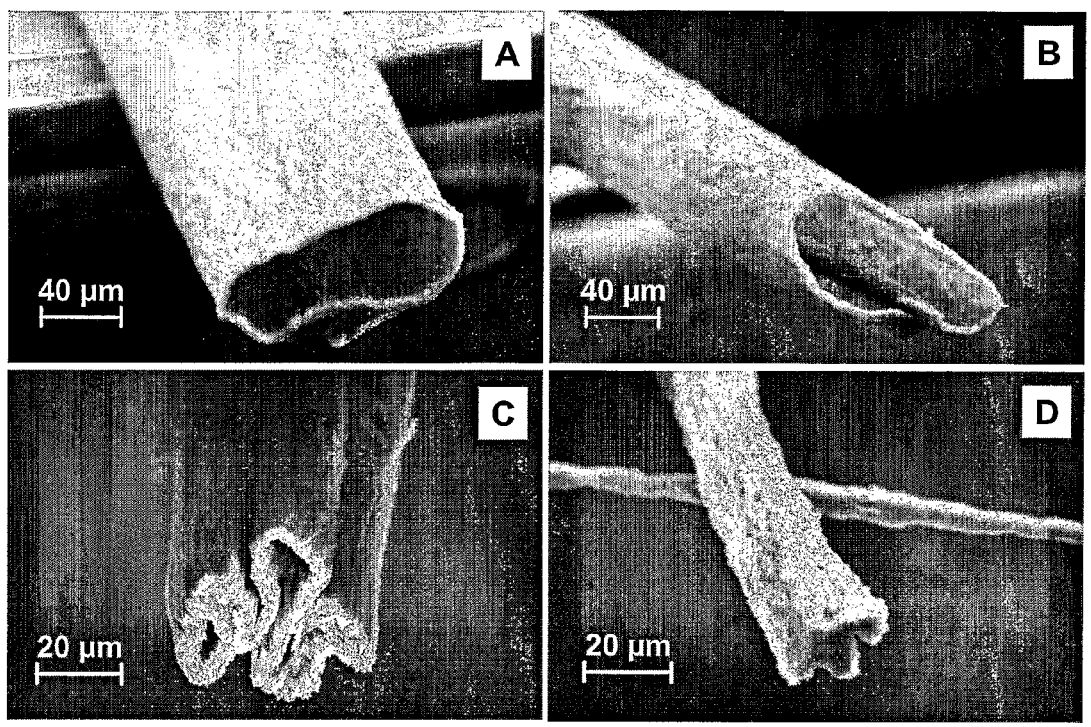
FIGS. 2A-D depict cross-sections of fibers of HiPco nanotubes spun by the polymer-free flocculation process, wherein such cross-sections are hollow (A, B), folded ribbon (C), and free of aggregated void space (D).

This Example illustrates the production of polymer-free carbon nanotube fibers that have variously shaped cross-sections, including hollow nanotube fibers, in accordance with some embodiments of the present invention. Single-walled carbon nanotubes produced by high pressure carbon monoxide reaction (HiPco nanotubes from Carbon Nanotechnologies Inc., 16200 Park Row, Houston, Tex. 77084-5195) were used. These SWNTs, in the amount of 0.6 wt % were dispersed in 15 ml of aqueous 1.2 wt % lithium dodecyl sulfate (LDS) surfactant with the aid of a horn-type ultra-sonicator (Branson Sonifier 250) at a power level of 50 W applied for 18 minutes. Immediately after sonication, the dispersion was loaded into a syringe; the syringe was attached to a syringe pump (KD Scientific) and coupled to a 20 gauge needle having a cylindrical inner diameter of 0.0230 inches. A round glass container was filled with flocculating agent comprising 37% hydrochloric acid (EMD), and the filled container was set on a turntable and rotated at a constant speed of 33 rpm. The prepared dispersion was slowly injected into the flocculating agent using the 20 gauge needle, thereby producing a gel fiber. The spun fibers were transferred to a wash bath and washed several times in methanol in order to remove surfactant species and flocculating agent. Finally, the gel fiber was pulled out of the wash bath, stretched over a sturdy frame, and dried under tension so that the gel dried to produce a solid nanotube fiber. Novel hollow fibers (FIGS. 2A and 2B) can be obtained when using an injection rate of about 0.70 ml/minute. Under similar spinning conditions, fibers having the appearance of a partially collapsed ribbon fiber can also result (FIG. 2C). Solid fibers with diameters of about 15 µm or less can be obtained using a lower injection rate (e.g., ~0.25 ml/minute), and these narrow fibers appear to result from the complete collapse of the gel fiber, which is typically initially ribbon-shaped.

EXAMPLE 2

This Example describes measurements of mechanical properties for the polymer-free flocculation spun fibers of EXAMPLE 1. Measurements of fiber tensile stress vs. strain measurements were typically carried out on 15 mm lengths of the fiber in an Instron 5848 Micro Tester. Fiber weight was determined with a microbalance. Recorded force was normalized by weight per fiber length (g/cm) so that specific values for stress and Young's modulus are reported in units of MPa/ (g/cm$^3$) and GPa/(g/cm$^3$), respectively. This density normalization was used to eliminate uncertainties in fiber cross-sectional area, which can be quite large when this cross-section is irregular. Such density-normalized mechanical properties are especially important when the weight of structural elements is important, such as for aerospace applications. This approach provides a lower limit on the tensile strength at the location of fiber failure. The obtained specific strength and specific Young's modulus for the polymer-free nanotube fibers were 30-65 MPa/g/cm$^3$ and 6-12 GPa/g/cm$^3$, respectively, and the elongation-to-break was in the range of about 0.8-4%.

EXAMPLE 3

This Example illustrates the production of polymer-free nanotube fibers that comprise mixtures of carbon single wall and multi-wall nanotubes. Hybrid SWNT/MWNT polymer-free carbon nanotube fibers were prepared as follows. A mixture of single-walled HiPco carbon nanotubes (Carbon Nanotechnologies Inc.) and multi-walled carbon nanotubes (Sunnano Co., 339 East Beijing Road, Nanchang, Jiangxi 330029, P.R. China) were used. These SWNTs and MWNTs were mixed in a ratio of 25:75 and dispersed in an amount of 0.6 wt % in 15 ml of aqueous 1 wt % lithium dodecyl sulfate (LDS) surfactant with the aid of a horn sonicator (Branson Sonifier 250) at a power level of 50 W applied for 18 minutes. Like in EXAMPLE 1, the prepared dispersion was injected into a flow of 37% hydrochloric acid, thus forming a gel fiber that was washed, drawn, and dried by a procedure essentially identical to the one described in EXAMPLE 1.

EXAMPLE 4

This Example illustrates the production of polymer-free nanotube fibers that comprise mixtures of carbon nanotube fibers with imogolite nanofibers. Hybrid SWNT/imogolite polymer-free carbon nanotube fibers were prepared as follows. Single-walled carbon nanotubes HiPco nanotubes (from Carbon Nanotechnologies Inc., 16200 Park Row, Houston, Tex. 77084-5195) were used. These SWNTs, in an amount of 0.5 wt %, were dispersed in 14.9 grams of aqueous 1.2 wt % lithium dodecyl sulfate (LDS) surfactant with the aid of a bath ultra-sonicator for 20 minutes, and then a horn ultra-sonicator (Branson Sonifier 250), at power level of 50 W, was applied for 18 minutes. Approximately 0.075 grams of imogolite was weighed and added to the solution to bring the total weight of the solution to 15.0 g. The mixture was then bath-sonicated again for an additional 20 minutes. Immediately after sonication, the dispersion was put into a syringe for use as a spinning solution; the syringe was attached to a syringe pump (KD Scientific) and supplied with a 20 gauge needle as a spinneret. A round glass container was filled with a solution of flocculating (coagulating) agent comprising 37% hydrochloric acid, set on a turntable and rotated at a constant speed of 33 rpm. The prepared dispersion was slowly injected into the flocculating solution, which resulted in the formation of a gel fiber. The gel fiber was transferred to a wash bath and washed for 2 hours in HPLC-grade methanol in order to remove surfactant and coagulating agent. Finally, the gel fiber was pulled out of the wash bath, stretched over a sturdy frame, and dried under tension to produce a solid nanotube fiber.

EXAMPLE 5

Figure 12:
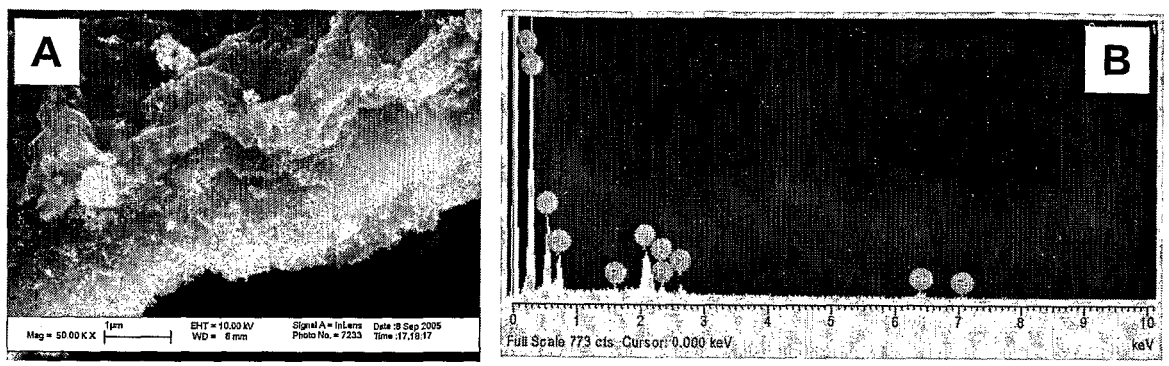
FIGS. 12 A-C depict an SEM image of a fracture surface for fibers spun from dispersion containing 3:1 mixture of HiPco nanotubes and platinum black particles by the polymer-free flocculation process (A), an EDX spectrum of the investigated area evidencing platinum in the fiber (B), and a table of weighted atomic percentages corresponding to the EDX spectrum (C).

This Example illustrates the production of polymer-free nanotube fibers that comprise mixtures of single walled carbon nanotubes and platinum particles. Hybrid SWNT/Pt polymer-free carbon nanotube fibers were prepared as follows. Single-walled carbon nanotubes HiPco nanotubes (from Carbon Nanotechnologies Inc., 16200 Park Row, Houston, Tex. 77084-5195) and platinum black (HiSPEC 1000 from Alfa Aesar, 26 Parkridge Road, Ward Hill, Mass. 01835) were used. The platinum black in an amount of 0.1 wt % was dispersed in 14.9 grams of aqueous 1.2 wt % lithium dodecyl sulfate (LDS) surfactant with the aid of a bath ultra-sonicator for 20 minutes, and then a horn ultra-sonicator (Branson Sonifier 250), at power level of 50 W, was applied for 18 minutes. Then SWNTs in an amount of 0.3 wt % were weighed and added to the dispersion. The mixture was then bath-sonicated again for an additional 20 minutes and a horn sonicated for 42 minutes. Immediately after sonication, the dispersion was put into a syringe for use as a spinning solution; the syringe was attached to a syringe pump (KD Scientific) and supplied with a 22 gauge needle as a spinneret. A round glass container was filled with a solution of flocculating (coagulating) agent comprising 37% hydrochloric acid, set on a turntable and rotated at a constant speed of 33 rpm. The prepared dispersion was slowly injected into the flocculating solution, which resulted in the formation of a gel fiber. The gel fiber was transferred to a wash bath and washed for 2 hours in HPLC-grade methanol in order to remove surfactant and coagulating agent. Finally, the gel fiber was pulled out of the wash bath, stretched over a sturdy frame, and dried under tension to produce a solid SWNT/Pt fiber. A high magnification SEM image of the fiber and EDX spectrum of the investigated area are shown in FIG. 12. The SEM image reveals small particles incorporated into fiber body that according to microprobe analysis can be associated with Pt black. The hybrid SWNT/Pt fiber is to be used in electrical sensor applications.

EXAMPLE 6

This Example illustrates the filling of the hollow polymer-free fibers of EXAMPLE 1 with a polymer, and, in particular, cylindrically-shaped hollow fibers with O-ring-like cross-sections of EXAMPLE 1, as pictured in FIG. 2A. This hollow fiber was dipped in a mixture containing 1 M methylmethacrylate, 0.75 M ethylmethylimidazolium imide ionic liquid, 0.02 M benzoyl peroxide (initiator) and 0.02 M tetraethylene glycol diacrylate (cross-linker). After dipping, the fiber was left at room temperature until the methylmethacrylate had polymerized. This hollow fiber structure, comprising hollow carbon nanotubes fibers filled with solid electrolyte, is useful for fiber-shaped carbon nanotube artificial muscles (i.e., electromechanical actuators), supercapacitors, and batteries, wherein the wall of the hollow fiber can serve as one electrode and a central wire can serve as the opposite electrode. Related devices that do not use hollow fibers are described by Baughman et al. in *Science* 284, 1340-1344 (1999) and by Tennent et al. in U.S. Pat. No. 6,031,711.

EXAMPLE 7

This Example describes an evaluation of the polymer-free nanotube fibers of EXAMPLE 1 as an electromechanical actuator for the generation of a mechanical force from a potential applied between the polymer-free nanotube fiber and a platinum mesh counter-electrode. The measured force generation was isometric, meaning that the polymer-free nanotube fiber was mechanically constrained to have constant length. In order to minimize the occurrence of creep, the polymer-free fiber of this Example was annealed at 1000° C. in argon for one hour. The electrolyte used was 1 M aqueous NaCl, and a potential applied between the nanotube fiber and the counter electrode provided the device response. The total cross-sectional area of the investigated fiber was determined by optical microscopy to be equal to about $0.00037~mm^2$. The electrochemically-generated force in these fibers was measured using a sensitive force transducer similar to the one used in a high precision analytical balance. The measured force change was normalized by the cross-sectional area of fiber to provide the actuator-generated stress. The fiber (attached to an arm of the force transducer) was placed in an aqueous 1 M NaCl solution, stretched under a constant stress of 64 MPa, and subjected to a periodically varied potential at a frequency of 0.03 Hz. The applied potential (measured versus saturated calomel (SCE) reference electrode) was a square wave potential, which was applied using a Gamry Instruments PC4 potentiostat. The nanotube fiber and a Pt mesh acted as the working and counter electrodes, respectively. The actuator generated stress arising from a nanotube fiber potential change (versus SCE) of from 0V to −1V was 7.0 MPa, which is about 20 times higher than for natural muscle. This result contrasts with the unusable actuator behavior of polymer-containing nanotube fibers made by the polymer coagulation spinning process, which lose their mechanical strength and swell unless the poly(vinyl alcohol) coagulation polymer is removed by pyrolysis.

EXAMPLE 8

Figure 7:
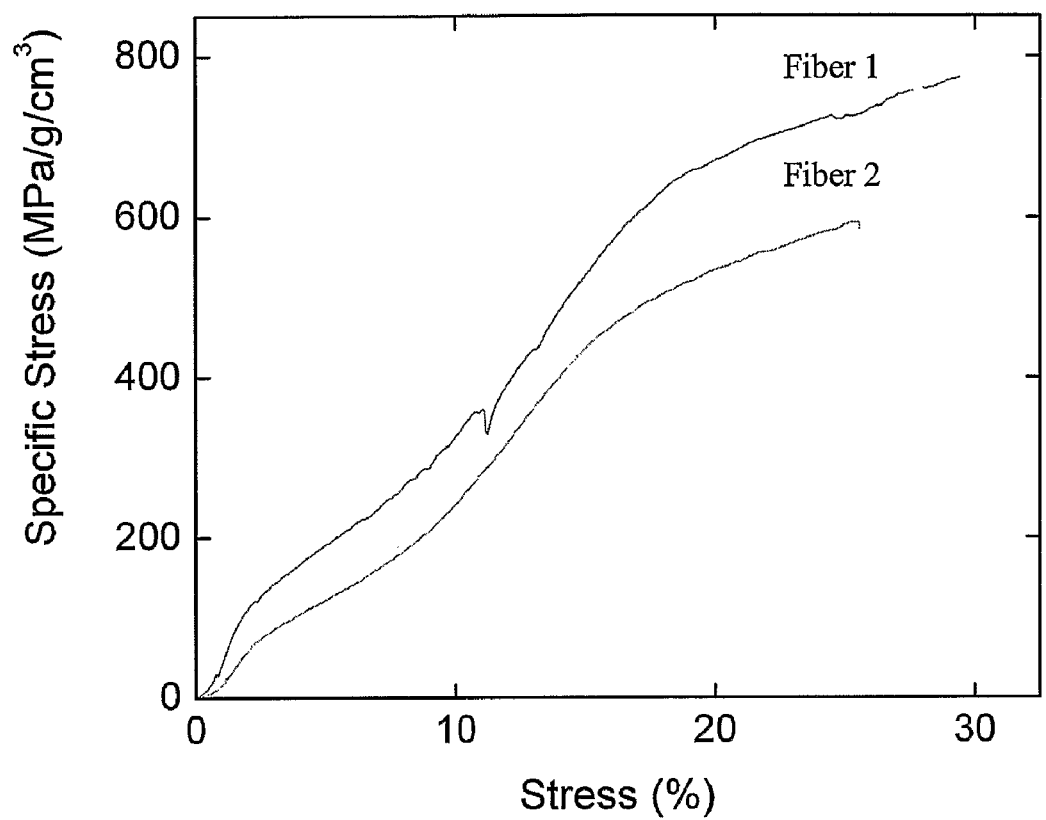
FIG. 7 depicts stress vs. strain dependencies for fibers of HiPco nanotubes spun by the polymer-free flocculation process that were infiltrated by polyvinyl alcohol (PVA) while in spun gel state, wherein data for two consecutive production runs are shown (Fiber 1 and Fiber 2).

This Example illustrates improvement of mechanical properties of nanotube fibers, when gel fibers made by the method of EXAMPLE 1 are infiltrated with polymer, and then dried. The mechanical properties were measured in air. A polymer-free carbon nanotube gel fibers was spun in 37% hydrochloric acid, as described in EXAMPLE 1. Subsequent to spinning the gel fiber, but before drying the gel fiber, the gel fiber was transferred from the acid bath (the flocculating solution) into a 5% aqueous solution of poly(vinyl alcohol) (PVA) where it soaked for 24 hours. After rinsing in water and drying in air, the two PVA-infiltrated fibers were manually drawn by 500%. Thereafter, these fibers were drawn to break with a Instron 5848 Micro Tester. Measurements of fiber tensile stress vs. strain measurements were carried out on 15 mm lengths of the fiber in the Instron 5848 Micro Tester. Fiber weight after the manual pre-draw was determined with a microbalance. Recorded force was normalized by weight per fiber length (g/cm) so that specific values for stress and Young's modulus are reported in units of MPa/(g/cm$^3$) and GPa/(g/cm$^3$), respectively. These specific mechanical properties are those that are most useful for applications where fiber weight is important, such as in aircraft and space applications. The specific stress data for two identically-prepared polymer-infiltrated fibers made by polymer-free spinning process is shown in FIG. 7 and collected in Table 1. It can be seen that the specific Young's modulus (at the beginning of the stress-strain curve where the fiber is drawn to break) and specific tensile strength are 8.9 GPa/g/cm$^3$ and 770 MPa/g/cm$^3$, respectively. For comparison, typical specific strength and Young's modulus values for the fibers before infiltration with polymer are 30-65 MPa/g/cm$^3$ and 6-12 GPa/g/cm$^3$. Also, polymer infiltration increases the strain-to-break from about 0.8-4% for the polymer free fibers to about 30% or more after polymer infiltration. This example shows that polymer infiltration, followed by fiber drawing, improves the mechanical strength of the resulting fibers by a factor of 6-10. Note also, that the herein reported modulii are initial values before enhancement by final mechanical draw to rupture, and that polymer incorporation substantially increases the modulus of the drawn fiber.

TABLE 1

Stress versus strain measurements for polymer infiltrated fibers produced by the method of EXAMPLE 8. Data shown here corresponds to the plots shown in FIG. 7.

| | Fiber Number | |
| --- | --- | --- |
| | Fiber 1 | Fiber 2 |
| Specific Young Modulus (GPa/g/cm$^3$) | 8.9 | 4.7 |
| Specific Tensile Strength (MPa/g/cm$^3$) | 770 | 600 |
| Elongation to Break (%) | 30 | 26 |

EXAMPLE 9

This Example shows that extraordinarily high fiber toughness can be obtained by infiltrating with the polymer infiltration process of EXAMPLE 8. As shown in EXAMPLE 8, the maximum achieved true tensile strength was 770 MPa/(g/cm$^3$), and the maximum strain-to-failure was 38%. By integration of the measured applied force versus displacement, and knowing the weight per fiber length, the toughness of this fiber was determined to be 137 J/g. This toughness exceeds that of commercial fibers used for anti-ballistic protection and is close to the maximum toughness observed for spider silk.

EXAMPLE 10

Figure 10:
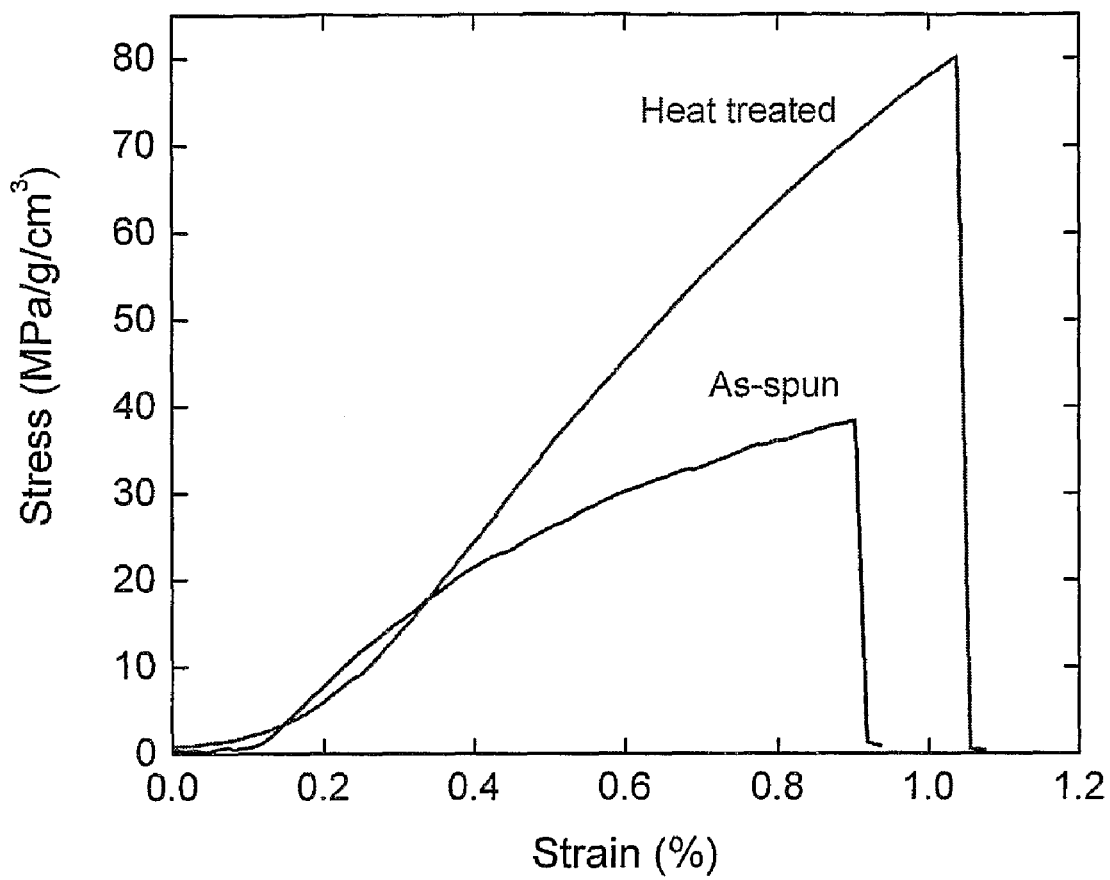
FIG. 10 depicts stress vs. strain plots for both heat-treated and as-spun fibers in accordance with some embodiments of the present invention.
Figure 11:
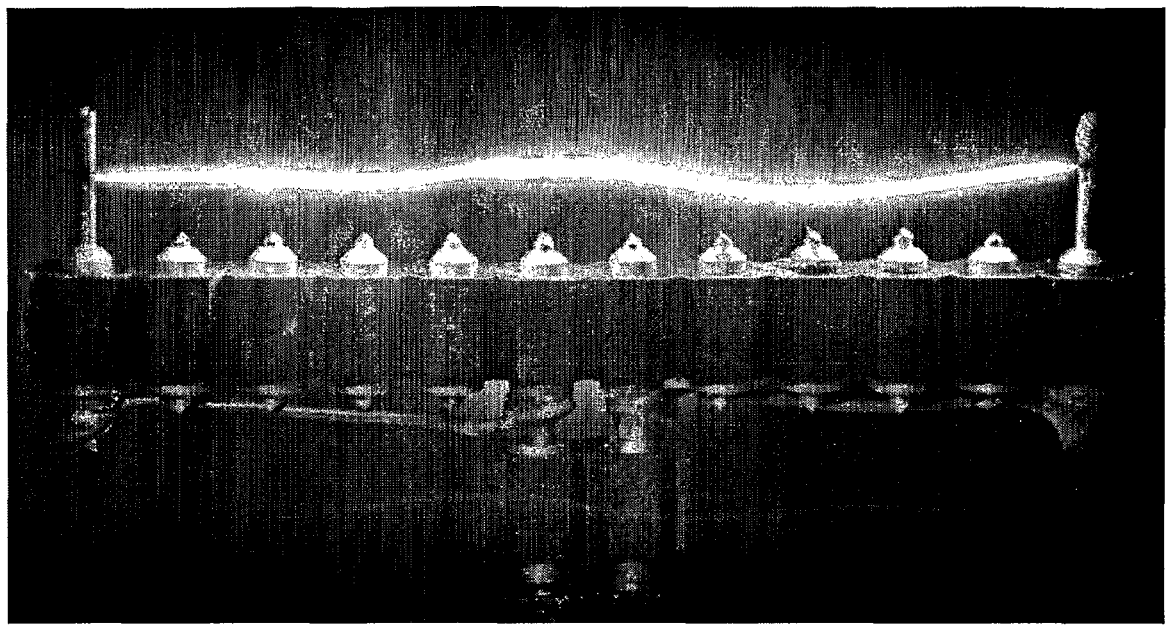
FIG. 11 is an optical image of fibers of HiPco nanotubes spun by the polymer-free flocculation process, which was taken while this fiber was heated to incandescence by direct electrical heating of the fiber in an oxygen-free environment.

This Example illustrates improvement of mechanical properties of polymer-free flocculation spun fibers as a result of post-spinning heat treatment, as well as the application of polymer-free flocculation spun fibers as an incandescent light source. Polymer-free carbon nanotube fiber was spun, washed, and dried as described in EXAMPLE 1. A section of the fiber (about 30 mm in length) was attached to two pins of an electrical connector with a conductive epoxy (Epoxy Technology Inc) and placed in glovebox with an Ar atmosphere, so that electrical current could be passed through the fiber in an oxygen-free environment. Upon applying dc voltage, the fiber was heated to a temperature of about 2000 K, which caused intense radiation (incandescence) of the material (FIG. 11), which was recorded and analyzed using a Spectroradiometer PR-650 (Photoresearch Inc). After keeping the fiber at high temperature for 10 minutes, the fiber was cooled down and removed from the glovebox. The mechanical properties of both as-spun and heat-treated fibers were tested with an Instron 5848 Micro Tester; their weight was determined with a microbalance. FIG. 10 depicts stress vs. strain plots for both the heat-treated and as-spun fibers. Specific values for failure stress and Young's modulus for as-spun and heat-treated fibers are shown in Table 2. It can be seen that the specific Young's modulus and specific tensile strength increase by 29% and 113%, respectively, as a result of this heat treatment using an applied electrical current.

TABLE 2

Stress vs strain measurements for as-spun and heat treated fibers made by the polymer-free flocculation spinning process.

| | Fiber | |
| --- | --- | --- |
| | As-spun | Heat-treated |
| Specific Young Modulus (GPa/g/cm$^3$) | 8.2 | 10.6 |
| Specific Tensile Strength (MPa/g/cm$^3$) | 37.6 | 80.3 |
| Elongation to Break (%) | 0.8 | 1.0 |

EXAMPLE 11

This Example illustrates a preparation of carbon nanotube fibers with the aid of poly(vinyl alcohol) (PVA) within the acid flocculation bath. An aqueous 37% hydrochloric acid solution was mixed with 1.0% by weight PVA, heated to 90° C., and constantly stirred until the PVA was completely dissolved. HiPco single-walled carbon nanotubes, in the amount of 0.5 wt %, were dispersed in 15 ml of aqueous 1.2 wt % lithium dodecyl sulfate (LDS) with the aid of a horn-type ultra-sonicator (Branson Sonifier 250) at power level of 50 W applied for 30 minutes. Immediately after sonication, the dispersion was loaded into a syringe; the syringe was attached to a syringe pump (KD Scientific) and supplied with a needle having an inner diameter of 0.0230 inches (20 gauge). A round glass container was filled with the PVA-containing hydrochloric acid solution, set on a turntable, and rotated at a constant speed of 33 rpm The prepared dispersion was slowly injected into the flocculating agent, thereby producing a gel fiber. The gel fiber was pulled out of the wash bath and washed with methanol. The washed gel fiber was then stretched over a sturdy frame and dried under tension so that the gel fiber transformed into a solid nanotube-containing fiber that also contained PVA.

EXAMPLE 12

This Example illustrates preparation of carbon nanotube ribbon using a gel fiber as a precursor. Polymer-free carbon nanotube fiber was spun as described in EXAMPLE 1 using a needle with inner diameter of 0.0540 inches (15 gauge) and washed in methanol. Subsequent to the spinning step, but before drying, the fiber was transferred to a flat Teflon-coated glass plate. A second Teflon-coated plate was put on top so that the fiber was sandwiched between two flat surfaces and formed a ribbon. After drying, the top plate was removed and the ribbon was pealed off the bottom plate. The prepared ribbon had an average thickness of about 20 μm and a width of about 6 mm.

EXAMPLE 13

Figure 4:
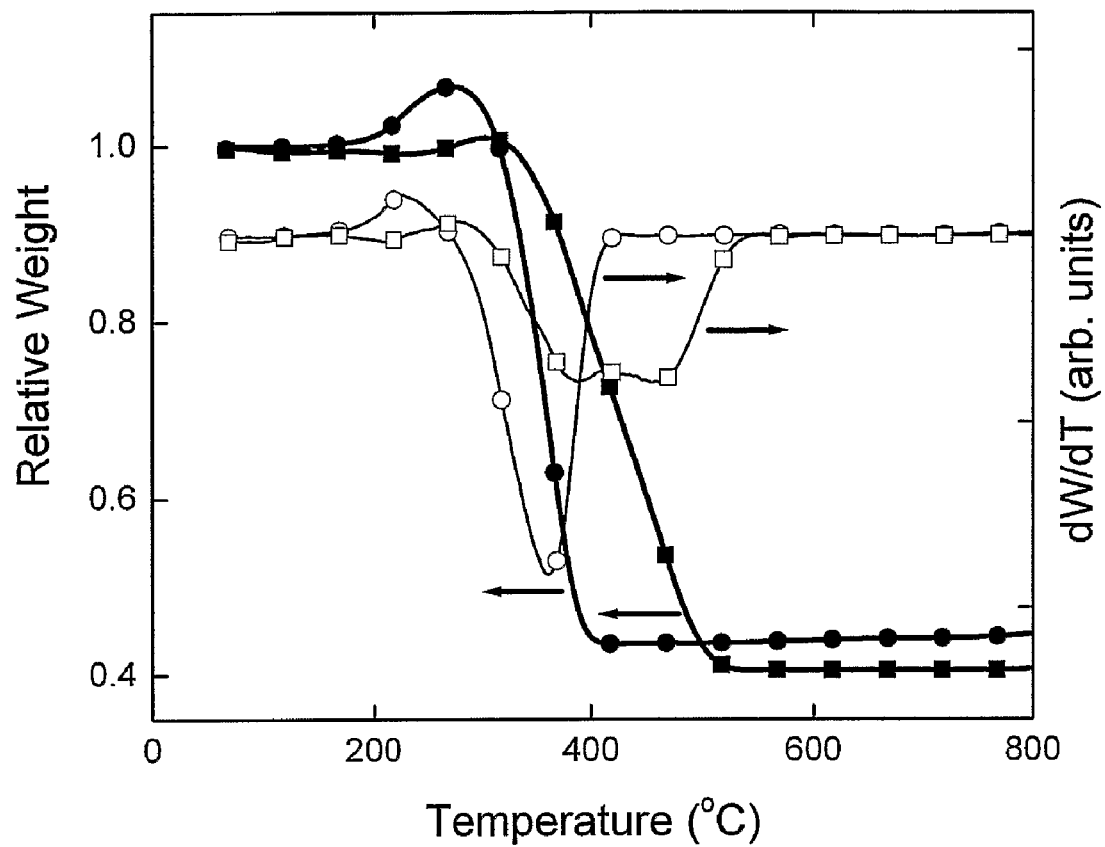
FIG. 4 depicts thermogravimetric analysis of retained weight versus temperature during the heating of as-synthesized HiPco SWNTs (■) and a fiber comprising HiPco nanotubes spun by the polymer-free flocculation process (●). The heating was in flowing oxygen at 5° C./minute. The derivatives of these weight loss curves, dW/dT, for the as-synthesized nanotubes (□) and the fibers of HiPco nanotubes spun by the polymer-free flocculation process (○) are also indicated.

This Example shows that the polymer-free flocculation spun fibers of EXAMPLE 1 can have high thermal stability in an ambient atmosphere, as indicated by a high thermal stability even in a pure oxygen atmosphere. This high thermal stability, even higher than for the iron-catalyst-containing HiPco nanotube fibers used for spinning, indicates that the spinning process has not introduced a significant amount of volatile or readily pyrolizable impurities. Thermogravimetric data (TGA) for the polymer-free flocculation spun nanotube fibers were collected using a Perkin-Elmer Thermogravimetric Analyzer Pyris1 TGA using a scan rate of 5° C./minute in an oxygen flow. FIG. 4 illustrates TGA profiles for both pristine HiPco nanotubes (● and ○) and polymer-free flocculation spun fiber derived therefrom (■ and □), along with corresponding derivative profiles for weight loss versus temperature (dW/dT). It is seen that both samples exhibit an initial weight increase at low temperatures, which is due to oxidation of the iron catalyst, likely to $Fe_2O_3$. It is clearly evident in FIG. 4 that polymer-free flocculation spun fiber is more resistant to oxidative reaction (burning) than are the HiPco nanotubes used for the polymer-free coagulation spinning. This increased stability for the polymer-free flocculation spun fiber is likely due to partial extraction of the iron by the acid in the flocculation bath, since this catalyst and catalyst-derived iron oxide, catalyzes nanotube combustion. This high oxidative stability is one advantage of the polymer-free flocculation spun nanotube fibers over polymer coagulation spun nanotube fibers.

EXAMPLE 14

Figure 3:
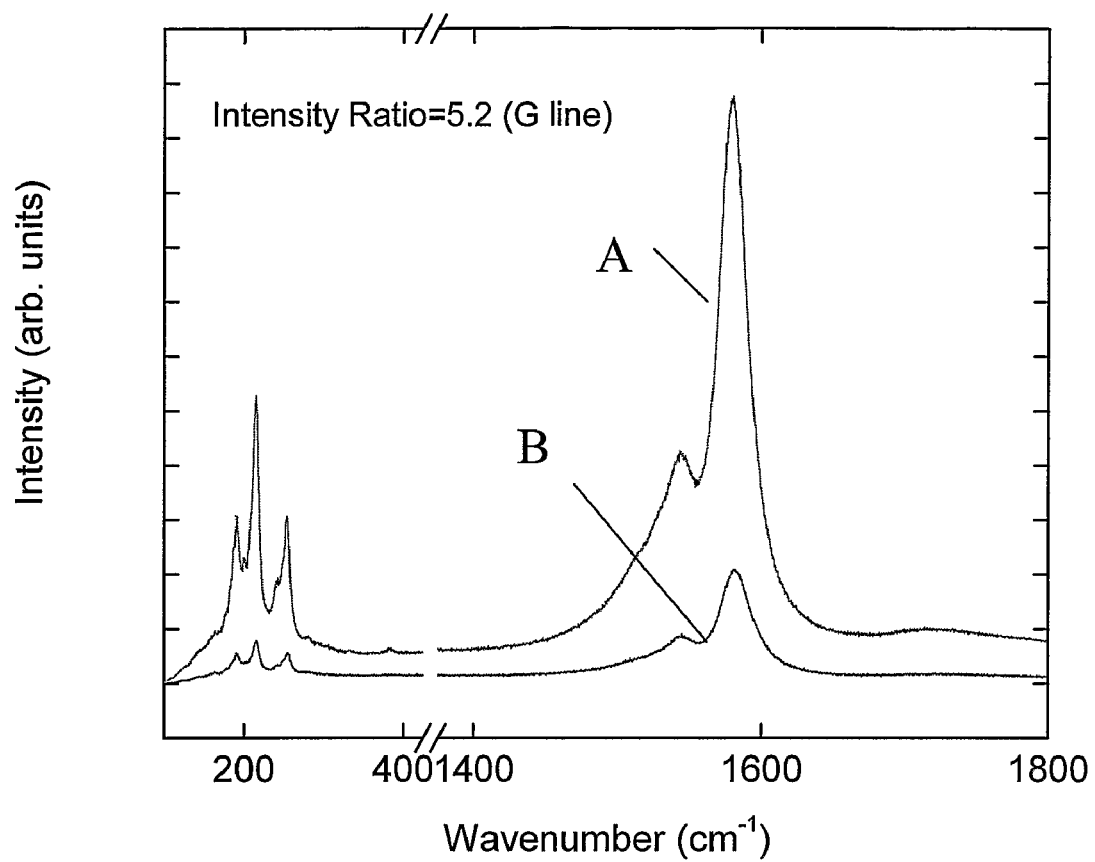
FIG. 3 depicts polarized Raman spectra of a fiber of HiPco nanotubes spun by the polymer-free flocculation process taken in YV geometry, wherein curves A and B correspond to orientations of light polarization parallel and perpendicular to the fiber axis, respectively.

This Example illustrates the use of Raman scattering measurements to probe nanotube alignment for the polymer-free flocculation spun fibers of EXAMPLE 1. Polarized Raman measurements were performed using a Jobin Yvon LabRam HR800 Raman microscope equipped with a He-Ne laser (λ=632.8 nm). It is known that the Raman intensity in the VV configuration (excitation and detection in the same polarization plane) for the tangential mode (G-line at ~1580 $cm^{-1}$ for HiPco nanotubes) decreases continuously when the angle between the nanotube axis and light polarization increases [A. Jorio et al., *Phys. Rev. B*, 65, 121402/1 (2002)]. The intensity ratio for polarizations of light parallel and perpendicular to the fiber axis, which is large if nanotubes in the fiber are aligned, was obtained by sampling multiple locations on the fiber and calculating an average of the G-band intensity. The Raman spectra of polymer-free flocculation spun fibers closely resemble that of HiPco nanotubes used for spinning, which is not the case for unannealed fibers spun by the super acid coagulation method of the prior art-which causes derivatization and a high degree of acid intercalation (insertion) into the nanotube bundles. Significant dependence of the intensity of Raman peaks was observed in polarized measurements as evidenced by FIG. 3 for spectra of fiber taken in the VV geometry. It can be seen from the figure that the intensity ratio for polarizations of light parallel (curve A) and perpendicular (curve B) to the fiber axis in the vicinity of the G line was equal to 5.2, which corresponds to a fairly high degree of nanotube alignment. Orientation of carbon nanotubes within the fibers of the present invention is at least partly attributed to extensional flow in the cylindrical needle and to post-spinning drying of the gel fiber under tension. As a result, the nanotubes generally assume a preferential orientation along the axis of the fiber and form aligned assemblies having walls comprised of oriented carbon nanotubes as shown in FIG. 1A. FIG. 1B is a cross-sectional SEM image of a fracture surface of the fiber.

EXAMPLE 15

This Example shows that the polymer-free flocculation spun nanotube fibers of EXAMPLE 1 are capable of providing high electrical conductivities. The nanotube fibers spun in this Example are HiPco nanotubes, which are normally much less conducting than other nanotube types (e.g., laser-ablation-produced nanotubes). Cross-sectional area was determined using an optical microscope. The measured electrical conductivity is 15 S/cm for the as-produced polymer-free flocculation spun nanotube fibers and 140 S/cm for these fibers after annealing in an inert atmosphere at 1000° C. for one hour, as compared with 2 S/cm or less for the super-tough polymer coagulation spun fibers described in the literature [A. B. Dalton et al. *Nature* 423, 703 (2003)].

EXAMPLE 16

Figure 6:
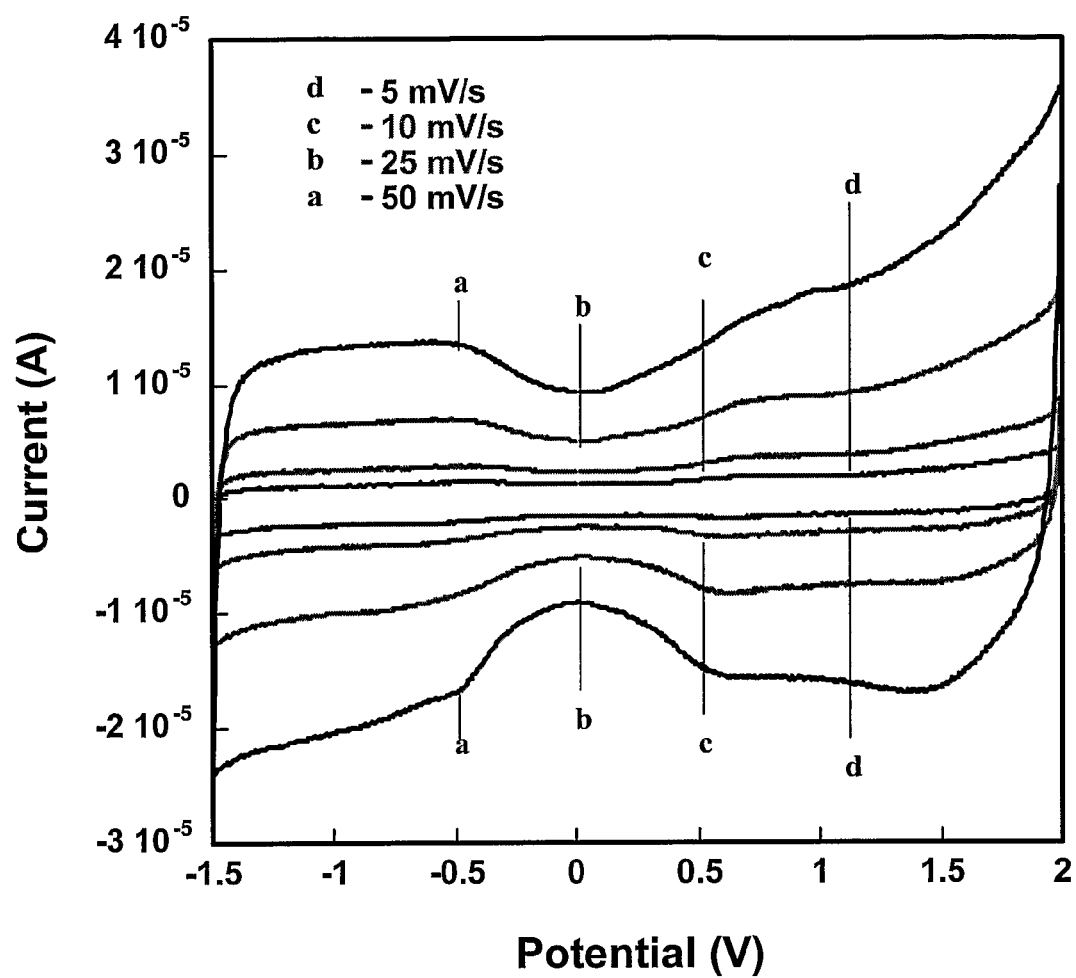
FIG. 6 depicts cyclic voltammogram of a fiber of HiPco nanotubes spun by the polymer-free flocculation process (vs. Ag/Ag$^+$ (0.01M AgNO$_3$)) for four different potential scan rates.

This Example shows that the polymer-free flocculation spun nanotube fibers of EXAMPLE 1 can provide the high specific capacitances needed for electrochemical devices such as electromechanical actuators (artificial muscles) and carbon nanotube supercapacitors. Also, this Example shows that the specific capacitance of these polymer-free flocculation spun nanotube fibers can increase upon annealing in inert atmosphere for one hour, rather than dramatically decreasing as in the case of fibers produced by the super-acid coagulation spinning method (where the high initial capacitance is due to intercalation and derivatization resulting from exposure to super acids). The capacitances of the initially produced polymer-free flocculation spun nanotube fibers and these fibers after annealing was measured using a 3-electrode cell with carbon felt as a counter electrode and $Ag/Ag^+$ (0.01M $AgNO_3$) as a reference electrode. The fiber was cycled in an ethylmethylimidazolium imide (EMIIm) ionic liquid electrolyte at different scan rates (50, 25, 10, and 5 mV/s) and potential windows (±1V and 2V to −1.5V). Referring to FIG. 6, cycles a, b, c, and d correspond to 50, 25, 10, and 5 mV/s, respectively. The current at a specific scan rate (where no redox processes are occurring) was taken and divided by the scan rate to obtain the capacitance (Farad, F). The specific capacitance was calculated by dividing the capacitance by the weight of the fiber. The specific capacitance of the initially produced polymer-free flocculation spun nanotube fibers was about 48 F/g and increased to about 100 F/g after annealing at 1000° C. for one hour in an inert atmosphere. This specific capacitance is much higher than the capacitance that is typically obtained for either as-produced or similarly annealed nanotube sheets (about 10-30 F/g).

EXAMPLE 17

This Example describes using the nanofibers of EXAMPLE 1 (whose capacitance is characterized in EXAMPLE 16) for making an all solid-state packaged fiber supercapacitor. The polymer-free, flocculation spun, carbon nanotube-based fibers were used to fabricate fiber supercapacitors by first separately coating the electrode fiber and the counter electrode fiber with a polymer ionic liquid solid electrolyte system (methylmethacrylate polymerized in the presence of ethylmethylimidazolium imide ionic liquid electrolyte). The fibers were then placed in close proximity and re-coated with the same electrolyte. The fiber supercapacitors are seen to give a specific capacitance of 7 F/g (based on the total device weight) when cycled in the ±1.5V potential window at 5 mV/s. Furthermore, the fibers show double-layer charging, as evidenced by the "box-like" cyclic voltammograms that are characteristic of double-layer capacitors.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A process comprising the steps of:
   a) dispersing nanofibers in a dispersion liquid that has a proton-donating ability that is below that of 100% sulfuric acid to form a dispersion of nanofibers, wherein the nanofibers are carbon nanofibers;
   b) providing a flocculation liquid, the liquid having a pH selected from the group consisting of acidic pH and basic pH, wherein the acidic pH is less than 3 and the basic pH is greater than 11;
   c) injecting the dispersion of nanofibers into the flocculation liquid such that flocculation occurs to yield a primary nanofiber assembly;
   d) infiltrating said primary nanofiber assembly with a polymer to form an infiltrated polymer prior to producing a secondary nanofiber assembly that is substantially free of a liquid; and
   e) substantially removing the flocculation liquid from the primary nanofiber assembly to yield the secondary nanofiber assembly that is substantially free of the flocculation liquid, wherein
      i) said secondary nanofiber assembly has a form selected from the group consisting of a fiber, a rope, a sheet, a ribbon, a film, and combinations thereof, and
      ii) said secondary nanofiber assembly is a fiber, wherein this fiber is mechanically drawn to at least 50% of the breaking strain, so as to thereby increase the orientation of nanofibers in the fiber.

2. The process of claim 1, wherein the step of dispersing involves using a dispersal aid that functions as a surfactant.

3. The process of claim 2, wherein the dispersal aid is selected from the group consisting of sodium dodecylsulfate, lithium dodecylsulfate, octylphenol ethoxylate, sodium dodecylbenzenesulfonate, sodium dodecylsulfonate, sodium n-lauroylsarcosinate, a sodium alkyl allyl sulfosuccinate, the sodium salt of poly(styrene sulfonate), charged colloidal particles, and combinations thereof.

4. The process of claim 1, wherein the step of dispersing involves ultrasonic assistance.

5. The process of claim 1, wherein the pH of the dispersion liquid is between 3 and 11.

6. The process of claim 1, wherein the pH of the dispersion liquid is between 6 and 8.

7. The process of claim 1, wherein said nanofibers comprise species selected from the group consisting of single walled nanotubes, double walled nanotubes, other types of multiwalled nanotubes other than double walled nanotubes, scrolled nanotubes, coiled nanofibers, functionalized nanofibers, crimped nanofibers, and combinations thereof.

8. The process of claim 1, wherein the nanofiber comprises predominately, by weight, material selected from the group consisting of single walled carbon nanotubes, types of multiwalled nanotubes other than double walled nanotubes, and combinations thereof.

9. The process of claim 8, wherein at least some of the carbon nanotubes are functionalized carbon nanotubes.

10. The process of claim 1, wherein said fiber comprises predominately, by weight, carbon nanotubes and impurities introduced during carbon nanotube synthesis.

11. The process of claim 1, wherein a polymer in the fiber is extracted after the mechanical draw via a technique selected from the group consisting of a liquid means, pyrolysis, and combinations thereof.

12. The process of claim 1, wherein the step of substantially removing the flocculation liquid is conducted while the primary nanofiber assembly is under mechanical tension, the tension having a maximum value during the liquid removal process that is at least 10% of the initial breaking stress of the primary nanofiber assembly.

13. The process of claim 1, wherein the flocculation agent comprises an acid selected from the group consisting of HCl, HBr, HI, $HClO_4$, $HBF_4$, $H_2SO_4$, $HNO_3$, $H_3PO_4$, oxalic acid, formic acid, acetic acid, benzoic acid, and combinations thereof.

14. The process of claim 1, wherein the flocculating agent comprises a base selected from the group consisting of NaOH, KOH, LiOH, $NH_4OH$, and combinations thereof.

15. The process of claim 1 further comprising a step of thermally annealing the secondary fiber at a temperature of less than 3000° C.

16. The process of claim 15, wherein said secondary fiber is comprised of carbon nanotubes, and wherein said thermal annealing involves a maximum temperature of less than 1500° C.

17. The process of claim 15, wherein said annealing is in a reactive atmosphere and wherein reaction induced by this atmosphere results in a treatment of the secondary fiber, the treatment selected from the group consisting of coating, infiltrating, and combinations thereof.

18. The process of claim 17, wherein said annealing is carried out in an environment selected from the group consisting of a vacuum, a substantially inert atmosphere, and combinations thereof.

19. The process of claim 1, wherein the flocculation liquid has a pH selected from the group consisting of acidic pH and basic pH, wherein the acidic pH is less than 2 and the basic pH is greater than 12.

20. The process of claim 19, wherein the flocculation liquid has a pH selected from the group consisting of acidic pH and basic pH, wherein the acidic pH is less than 1 and the basic pH is greater than 13.

* * * * *